United States Patent
Park et al.

(10) Patent No.: US 11,837,010 B2
(45) Date of Patent: Dec. 5, 2023

(54) INPUT SENSING METHOD AND INPUT SENSING DEVICE INCLUDING THE SAME

(71) Applicant: SAMSUNG DISPLAY CO., LTD., Yongin-si (KR)

(72) Inventors: Kyung Tea Park, Yongin-si (KR); Jong Hyun Lee, Yongin-si (KR); Kang Bin Jo, Yongin-si (KR); Go Eun Cha, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 78 days.

(21) Appl. No.: 17/333,798

(22) Filed: May 28, 2021

(65) Prior Publication Data

US 2022/0050984 A1 Feb. 17, 2022

(30) Foreign Application Priority Data

Aug. 14, 2020 (KR) .................... 10-2020-0102734

(51) Int. Cl.
*G06V 40/13* (2022.01)
*G09G 3/20* (2006.01)

(52) U.S. Cl.
CPC ...... *G06V 40/1306* (2022.01); *G06V 40/1318* (2022.01); *G09G 3/2092* (2013.01);
(Continued)

(58) Field of Classification Search
CPC ........... G06V 40/1306; G06V 40/1318; G09G 3/2092; G09G 2310/0275;
(Continued)

(56) References Cited

U.S. PATENT DOCUMENTS

| 6,128,039 A | 10/2000 | Chen et al. |
| 9,823,771 B2 | 11/2017 | Bae et al. |

(Continued)

FOREIGN PATENT DOCUMENTS

| EP | 1303134 | 4/2003 |
| EP | 2833620 | 4/2015 |

(Continued)

OTHER PUBLICATIONS

Extended European Search Report issued from the European Patent Office dated May 9, 2022 in corresponding European Patent Application No. 211913652 filed on Aug. 13, 2021.

*Primary Examiner* — Roberto W Flores
(74) *Attorney, Agent, or Firm* — Chau & Associates, LLC

(57) ABSTRACT

An input sensing device includes: sensor pixels, a horizontal driver, a selection circuit, and a vertical driver. Each of the sensor pixels is connected to a plurality of driving lines and a one of a plurality of signal input lines. The horizontal driver sequentially applies a horizontal driving signal to the sensor pixels through the driving lines. The selection circuit is connected to n of the signal input lines (n is a natural number of 2 or more) and to one output line. The selection circuit sequentially outputs n sensing signals received through the n signal input lines to the one output line. The vertical driver receives the n sensing signals through the one output line. The horizontal driver applies the horizontal driving signal n times to a given one of the driving lines to correspond to the n sensing signals.

10 Claims, 17 Drawing Sheets

(52) U.S. Cl.
CPC ........... *G09G 2310/0275* (2013.01); *G09G 2330/028* (2013.01)

(58) Field of Classification Search
CPC ........... G09G 2330/028; G09G 3/3233; H04N 5/3532; H04N 5/3575; H04N 5/378; H04N 5/376; H04N 5/374; H04N 5/3745; H04N 5/37455; H04N 5/372–379; H04N 25/616; H04N 25/75; H04N 25/531; H04N 25/76; H04N 25/77; H04N 25/772; H04N 25/74–79; H01L 27/14603; H01L 27/14636; G06F 3/042–0428
See application file for complete search history.

(56) References Cited

U.S. PATENT DOCUMENTS

| | | | |
|---|---|---|---|
| 10,572,085 B2 | 2/2020 | Jung et al. | |
| 2005/0110885 A1* | 5/2005 | Altice, Jr. | H01L 27/148 348/E3.018 |
| 2006/0262204 A1* | 11/2006 | Dosluoglu | H04N 25/677 348/241 |
| 2008/0036891 A1* | 2/2008 | Ono | H04N 25/627 348/308 |
| 2009/0321799 A1* | 12/2009 | Velichko | H04N 25/587 257/292 |
| 2010/0073537 A1* | 3/2010 | Kato | H04N 5/3575 348/308 |
| 2010/0079648 A1* | 4/2010 | Totsuka | H04N 5/3742 348/308 |
| 2010/0141263 A1 | 6/2010 | Nakamura | |
| 2013/0100330 A1* | 4/2013 | Yamada | H04N 5/363 348/E5.022 |
| 2013/0162874 A1* | 6/2013 | Hashimoto | H04N 5/357 348/300 |
| 2014/0022426 A1* | 1/2014 | Minami | G06F 3/0412 348/294 |
| 2018/0203562 A1 | 7/2018 | An et al. | |
| 2019/0087620 A1 | 3/2019 | Kim et al. | |
| 2019/0197287 A1 | 6/2019 | Han et al. | |
| 2020/0065541 A1 | 2/2020 | Jung et al. | |
| 2020/0219447 A1* | 7/2020 | Talebzadeh | G09G 3/3258 |
| 2021/0320143 A1* | 10/2021 | Smit | H04N 25/79 |
| 2022/0021789 A1* | 1/2022 | Surendranath | H04N 25/616 |

FOREIGN PATENT DOCUMENTS

| | | |
|---|---|---|
| KR | 10-1758047 | 7/2017 |
| KR | 1020180083737 | 7/2018 |
| KR | 1020190033235 | 3/2019 |
| KR | 1020190047790 | 5/2019 |
| KR | 1020190052729 | 5/2019 |
| KR | 1020190075755 | 7/2019 |
| KR | 1020200022060 | 3/2020 |
| WO | 2009017920 | 2/2009 |
| WO | 2013046587 | 4/2013 |
| WO | 2018140015 | 8/2018 |

* cited by examiner

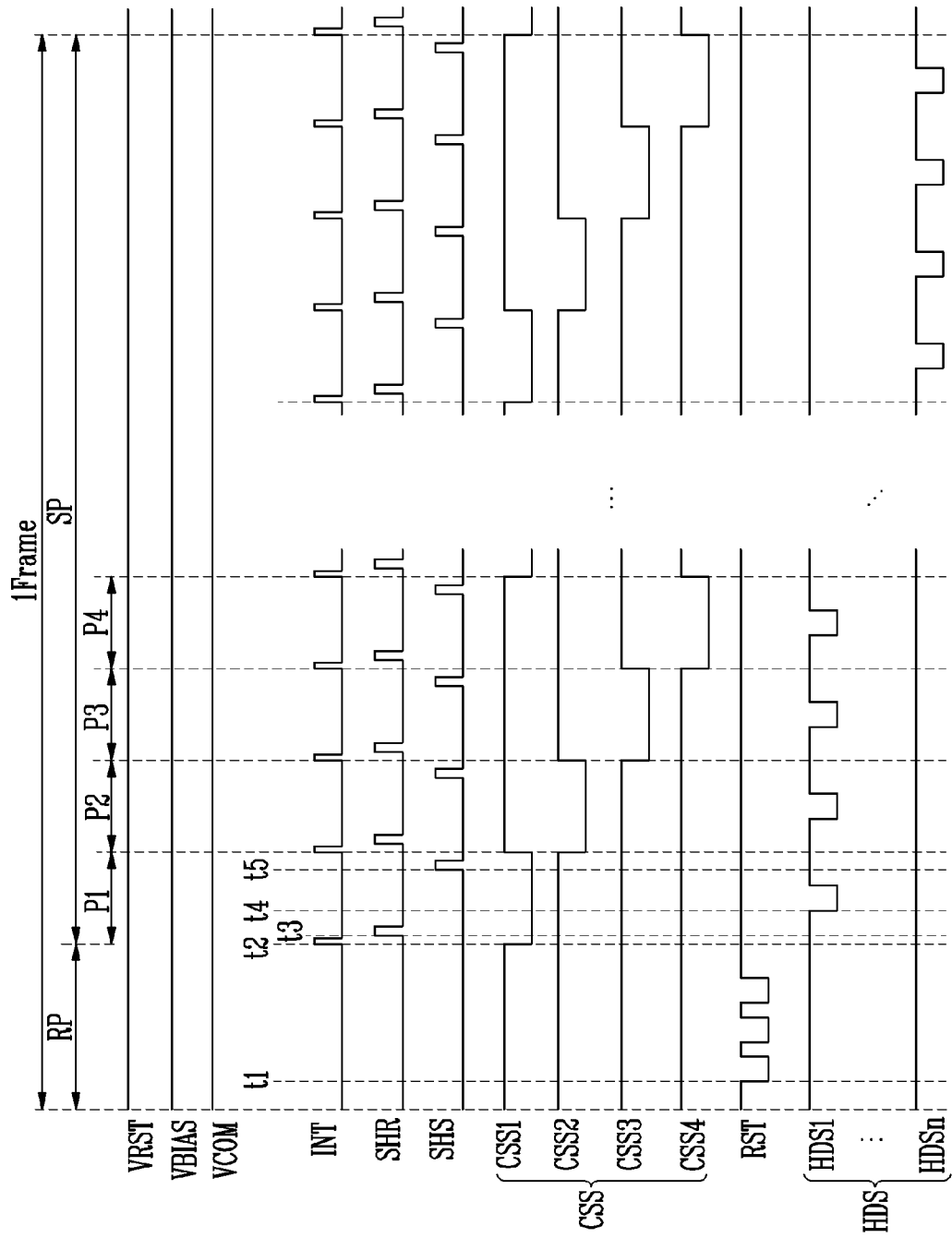

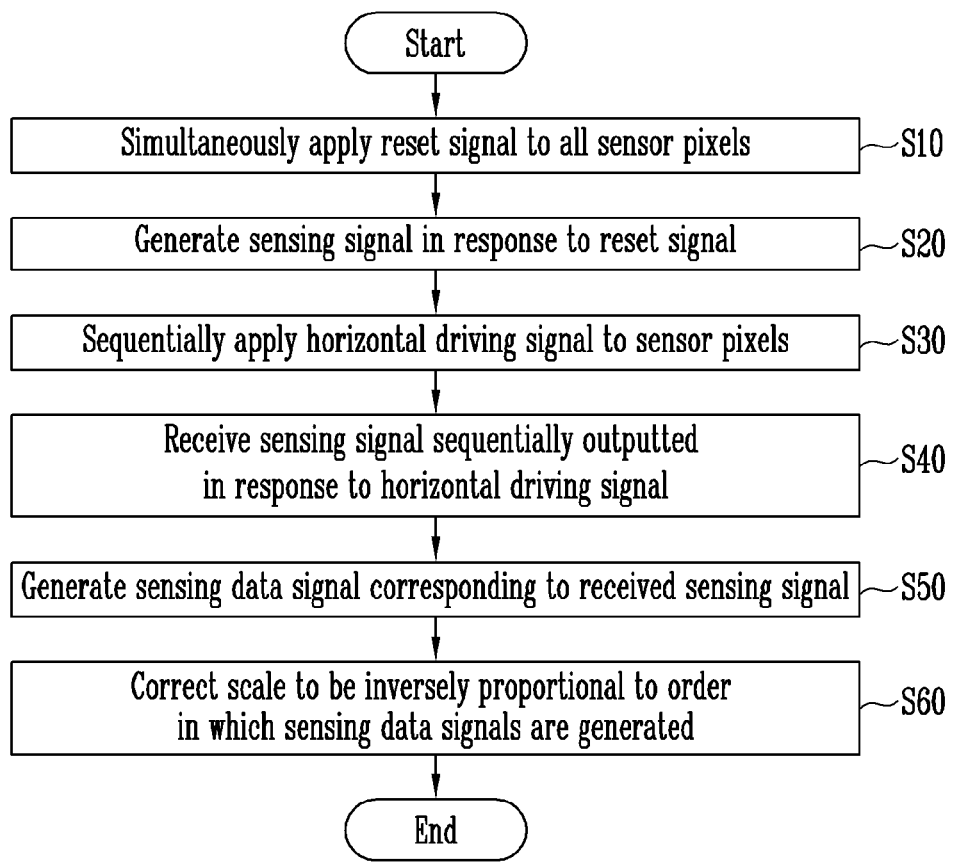

INPUT SENSING METHOD AND INPUT SENSING DEVICE INCLUDING THE SAME

CROSS-REFERENCE TO RELATED APPLICATION

This U.S. non-provisional patent application claims priority under 35 U.S.C. § 119 to Korean Patent Application No. 10-2020-0102734, filed on, Aug. 14, 2020, the disclosure of which is incorporated by reference in its entirety herein.

(a) TECHNICAL FIELD

The disclosure relates to an input sensing method and a display device including the same.

(b) DISCUSSION OF RELATED ART

Display devices such as smartphones and tablet personal computer (PC) may be accessed after authenticating biometric information of a user such as a fingerprint. A fingerprint sensor to sense the biometric information may be embedded within the display device or attached to a portion of the display device. A display device that includes such a fingerprint sensor may be referred to as a fingerprint sensor integrated display device or a fingerprint on display (FOD).

An FOD may include a large number of photo sensors. Accordingly, the FOD includes a large number of output lines to transmit sensing signals from the photo sensors to an input detector. In addition, a reset driver of the FOD includes a large number of stage circuits to initialize the large number of photo sensors. However, the large number of output lines and stage circuits may produce excessive noise and increase a size of the FOD. The noise may reduce sensing sensitivity of the FOD. The increased size may be undesirable to a user and may increase a manufacturing cost of the FOD.

SUMMARY

At least one embodiment of the present invention has been made in an effort to provide an input sensing device that minimizes an increase in size of a reset driver and an input detector and reduces a manufacturing cost of an FOD having a large area.

At least one embodiment of the present invention has been made in an effort to provide an input sensing method with improved sensing sensitivity by reducing the effect of external noise, and an input sensing device including the same.

According to an exemplary embodiment of the present invention, an input sensing device includes: a plurality of sensor pixels, a horizontal driver, a selection circuit, and a vertical driver. Each sensor pixel is connected to a corresponding one of a plurality of driving lines and a corresponding one of a plurality of signal input lines. The horizontal driver is configured to sequentially apply a horizontal driving signal to the sensor pixels through the driving lines. The selection circuit is connected to n of the signal input lines (n is a natural number of 2 or more) and to one output line. The selection circuit is configured to sequentially output n sensing signals received through the n signal input lines to the one output line. The vertical driver is configured to receive the n sensing signals through the one output line. The horizontal driver applies the horizontal driving signal to a given one of the driving lines n times to correspond to the n sensing signals.

In an embodiment, the vertical driver includes an integration circuit for integrating the sensing signal to generate a first output signal, and the integration circuit includes an amplifier, a capacitor, and an initialization switch. The amplifier includes a first input terminal connected to the output line, a second input terminal connected to a reference voltage line, and an output terminal. The capacitor includes a first electrode connected to the first input terminal and a second electrode connected to the output terminal. The initialization switch is disposed between the first input terminal and the output terminal.

The vertical driver may include an analog-to-digital converter that converts the first output signal of an analog type into a sensing data signal of a digital type.

The vertical driver may further include a correlated double sampling circuit disposed between the output terminal of the amplifier and the analog-to-digital converter.

In an exemplary embodiment, the correlated double sampling circuit include a first sampling switch, a second sampling switch, a first sampling capacitor, a second sampling capacitor, and a differential amplifier. The first sampling switch is disposed between the output terminal and the analog-to-digital converter. The second sampling switch is disposed between the output terminal and the analog-to-digital converter. The first sampling capacitor includes one terminal connected between the first sampling switch and the analog-to-digital converter. The second sampling capacitor includes one terminal connected between the second sampling switch and the analog-to-digital converter. The differential amplifier includes a first input terminal connected to one terminal of the first sampling capacitor, a second input terminal connected to one terminal of the second sampling capacitor, and an output terminal.

In an exemplary embodiment, the correlated double sampling circuit turns on the first sampling switch before the horizontal driving signal is applied to store a (1_1)-th output signal in the first sampling capacitor, and turns on the second sampling switch after the horizontal driving signal is applied to store a (1_2)-th output signal in the second sampling capacitor, and the differential amplifier outputs a (1_3)-th output signal by differentiating the (1_1)-th output signal and the (1_2)-th output signal.

The amplifier may turn on the initialization switch before turning on the first sampling switch.

The input sensing device may further include n transistors connected between the n signal input lines and the one output line.

The horizontal driving signal may be applied n times to each driving line.

Each of the n transistors may be turned on before the first sampling switch is turned on, and may be turned off after the second sampling switch is turned off.

Each of the n transistors may be turned on before the initialization switch is turned on.

The sensor pixel may be further connected to a reset voltage power line, a bias voltage power line, and a common voltage power line.

The input sensing device may further include a reset unit that is connected to the plurality of sensor pixels and a reset signal control line and simultaneously applies a reset voltage to the plurality of sensor pixels.

In an exemplary embodiment, the sensor pixel includes a first transistor, a photodiode, a second transistor, and a third transistor. The first transistor includes a first electrode connected to the reset voltage power source, a second electrode connected to a first node, and a gate electrode connected to the reset signal control line. The photodiode includes an anode electrode connected to the bias voltage power line and a cathode electrode connected to the first node. The second transistor includes a first electrode connected to the common voltage power line, a second electrode connected to a second node, and a gate electrode connected to the first node. The third transistor includes a first electrode connected to the second node, a second electrode connected to the signal input line, and a gate electrode connected to the driving line.

The sensor pixel may further include a capacitor including a first electrode connected to the bias voltage power line and a second electrode connected to the first node.

An exemplary embodiment of the present invention provides an input sensing device including: a plurality of sensor pixels, a reset circuit, and a horizontal driver. The pixels are connected to a reset control line and a driving line. The reset circuit applies a reset signal through reset control lines connected to each of the sensor pixels. The horizontal driver sequentially provides a horizontal driving signal to the sensor pixels through the driving line. The reset circuit simultaneously applies a reset signal to the sensor pixels.

The reset unit may apply the reset signal to the sensor pixels a plurality of times before applying the horizontal driving signal to the sensor pixels.

The sensor pixel may be further connected to a signal input line, a reset voltage power line, a bias voltage power line, and a common voltage power line. In an exemplary embodiment, the sensor pixel includes: a first transistor, a photodiode, a second transistor, and a third transistor. The first transistor includes a first electrode connected to the reset voltage power line, a second electrode connected to a first node, and a gate electrode connected to a corresponding one of the reset signal control lines. The photodiode includes an anode electrode connected to the bias voltage power line and a cathode electrode connected to the first node. The second transistor includes a first electrode connected to the common voltage power line, a second electrode connected to a second node, and a gate electrode connected to the first node. The third transistor includes a first electrode connected to the second node, a second electrode connected to the signal input line, and a gate electrode connected to the driving line.

An exemplary embodiment of the present invention provides an input sensing method including: simultaneously applying a reset signal to a plurality of sensor pixels; generating a sensing signal in response to the reset signal; sequentially applying a horizontal driving signal to the sensor pixels; receiving the sensing signal sequentially outputted in response to the horizontal driving signal; generating a sensing data signal corresponding to the received sensing signal; and correcting the sensing data signal.

The correcting of the sensing data signal may include dividing the sensing data signal by a value proportional to an amount of time in which the one sensor pixel is exposed to light.

A magnitude or amplitude of the sensing signal may increase in proportion to a period between a time point the reset signal is applied and a time point the horizontal driving signal is applied.

The simultaneously applying of the reset signal to the plurality of sensor pixels may further include providing the reset signal to the sensor pixels a plurality of times before applying the horizontal driving signal to the sensor pixels.

The input sensing device according to the embodiment of the present invention includes a reset driver that simultaneously applies a reset voltage to all photo sensors of an FOD and a multiplexer between the photo sensors and an input detector, thus it is possible to minimize increase in size of the reset driver and the input detector and to reduce a manufacturing cost thereof.

According to an exemplary embodiment of the present invention, an input sensing device includes: a plurality of sensor pixels, a horizontal driver, a selection circuit, and a vertical driver. Each sensor pixel is connected to a corresponding one of a plurality of driving lines and a corresponding one of a plurality of signal input lines. The horizontal driver is configured to sequentially apply a horizontal driving signal to the sensor pixels through the driving lines. The selection circuit is connected to n of the signal input lines (n is a natural number of 2 or more) and to one output line. The selection circuit is configured to sequentially output n sensing signals received through the n signal input lines to the one output line. The vertical driver is configured to receive the n sensing signals through the one output line. The horizontal driver generates the horizontal driving signal to include n transitions during a single frame period, to correspond to the n sensing signals.

In an exemplary embodiment, a reset voltage applied to the plurality of sensor pixels includes a plurality of transitions before the n transitions of the horizontal driving signal.

BRIEF DESCRIPTION OF THE DRAWINGS

FIG. 8A and FIG. 8B illustrate waveform diagrams for explaining an exemplary operation of the sensor array of FIG. 6A.

FIG. 14 illustrates a flowchart of a sensing method of an input sensing device according to an exemplary embodiment of the invention.

DETAILED DESCRIPTION OF EXEMPLARY EMBODIMENTS

Figure 1A:
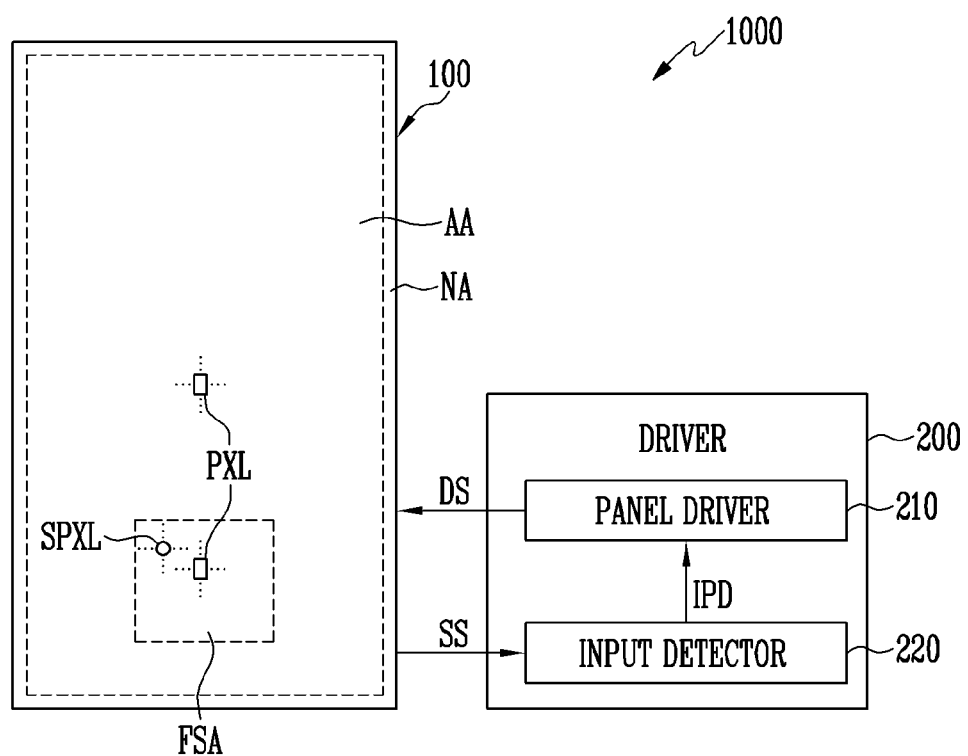
FIG. 1A illustrates a block diagram of a display device according to an exemplary embodiment of the present invention.

The present invention will be described more fully hereinafter with reference to the accompanying drawings, in which exemplary embodiments thereof are shown. Those of ordinary skilled in the art would recognize the described embodiments may be modified in various different ways, all without departing from the spirit or scope of the present invention.

Identical or similar constituent elements throughout the specification are denoted by the same reference numerals to clearly describe embodiments of the present invention. Therefore, the above-mentioned reference numerals may be used in other drawings.

Further, in the drawings, the size and thickness of each element are illustrated for ease of description, and the present disclosure is not necessarily limited to those illustrated in the drawings. In the drawings, the thicknesses of layers, films, panels, regions, etc. may be exaggerated for clarity.

Figure 1B:
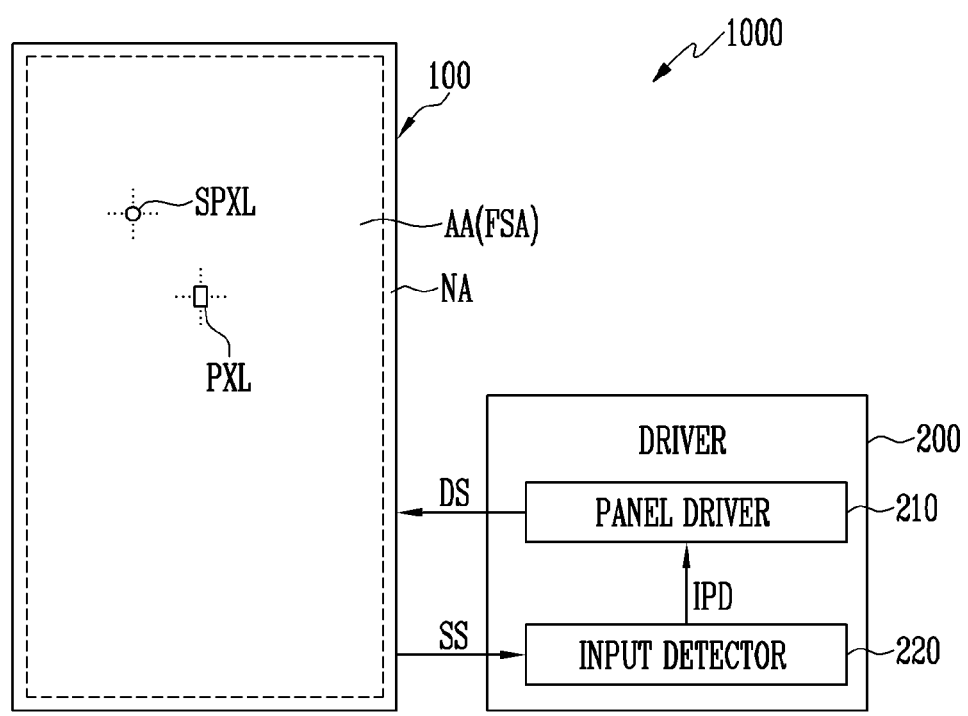
FIG. 1B illustrates a block diagram of a display device according to an exemplary embodiment of the present invention.

FIG. 1A illustrates a block diagram of a display device according to an exemplary embodiment of the present invention. FIG. 1B illustrates a block diagram of a display device according to an exemplary embodiment of the present invention. FIG. 1A and FIG. 1B schematically illustrate a display device.

Referring to FIG. 1A and FIG. 1B, a display device 1000 includes a display panel 100 and a driver 200 (e.g., a driving circuit). For convenience, FIG. 1A and FIG. 1B illustrate that the display panel 100 and the driver 200 are separate from one another, but the present invention is not limited thereto. For example, all or a portion of the driver 200 may be integrally implemented on the display panel 100.

All or at least a portion of the display panel 100 may be flexible.

The display panel 100 includes a display area AA and a non-display area NA. A pixel PXL (or a plurality of pixels) is provided in the display area AA, and the display area AA may be referred to as an active area. The pixel PXL may include at least one light emitting element. The display device 1000 displays an image in the display area AA by driving the pixels PXL in response to image data inputted from the outside.

In an exemplary embodiment, the display area AA includes an input sensing area FSA. At least some of the pixels PXL provided in the display area AA may be located in the input sensing area FSA.

In the embodiment, as shown in FIG. 1A, at least a portion of the display area AA corresponds to the input sensing area FSA.

Meanwhile, FIG. 1A illustrates an example in which only one input sensing area FSA is set in the display area AA, but the present invention is not limited thereto. For example, a plurality of the input sensing areas FSA that are regularly or irregularly arranged or shaped may be located in the display area AA.

In addition, FIG. 1A illustrates an example in which the input sensing area FSA is located in at least a portion of the display area AA, but the present invention is not limited thereto. For example, the display area AA and the input sensing area FSA may overlap only in at least some area.

In an exemplary embodiment, as shown in FIG. 1B, all of the display area AA corresponds the input sensing area FSA. In this case, when input sensing is performed, an input sensing operation may be performed only in a portion that is substantially touched by a user. Hereinafter, an input means a pattern or biometric information formed by ridges of a user's skin, and may include for example, a user's fingerprint or palm pattern.

The non-display area NA is disposed around the display area AA, and may be referred to as a non-active area. For example, the non-display area NA may include a wire area, a pad area, or various dummy areas.

In an exemplary embodiment, the display device 1000 further includes a sensor pixel SPXL located in the input sensing area FSA. The sensor pixel SPXL may be configured as a sensor for sensing light. In an exemplary embodiment, when light emitted from a light source (or the pixel PXL) located in the display device 1000 is reflected by a user's body (for example, a finger or palm), the sensor pixel SPXL senses the reflected light to output a corresponding electrical signal (for example, a voltage signal). The electrical signal may be transmitted to the driver 200 (for example, an input detector 220), and may be used for input sensing. Hereinafter, although an embodiment of the present invention is described where the sensor pixel SPXL is used for input sensing (for example, fingerprint sensing) as an example, the sensor pixel SPXL may be used for performing functions other than fingerprint sensing such as in a touch sensor or a scanner.

When the sensor pixel SPXL is located in the input sensing area FSA (or when it is disposed on the input sensing area FSA), the sensor pixel SPXL may overlap the pixel PXL, or may be disposed around the pixel PXL. For example, a portion or all of the sensor pixel SPXL may overlap the pixel PXL, or the sensor pixel SPXL may be disposed between the pixel PXL and the pixel PXL adjacent thereto. The sensor pixel SPXL and the pixel PXL may have the same size or different sizes. A relative size and arrangement between sensor pixel SPLX and the pixel PXL are not limited to any particular configuration.

In an embodiment where the sensor pixel SPXL is disposed adjacent to the pixel PXL or overlaps at least a portion thereof, the sensor pixel SPXL may use a light emitting element provided in the pixel PXL as a light source. In this embodiment, the sensor pixel SPXL may configure a light sensing type of input sensing sensor together with the light emitting element provided in the pixel PXL. As such, when an input sensing sensor embedded display device (for example, a fingerprint sensor embedded display device) is configured by using the pixel PXL as a light source without a separate external light source, thicknesses of the light sensing type of input sensing sensor and the display device having the same may be reduced, and a manufacturing cost may be reduced.

In some embodiments, the sensor pixel SPXL may be disposed on a first surface (for example, a rear surface) opposite to a second surface (for example, a front surface) on which an image is displayed among opposite surfaces of the display panel 100. However, the present invention is not limited thereto.

The driver 100 may drive the display panel 100. For example, the driver 100 may output a data signal DS corresponding to image data to the display panel 100. In addition, the driver 200 may output a driving signal for the sensor pixel SPXL, and receive an electrical signal (for example, a sensing signal SS) from the sensor pixel SPXL.

The driver 200 may detect a user's input (for example, fingerprint or palm print) by using the electrical signal.

In an exemplary embodiment, the driver 200 includes a panel driver 210 and the input detector 220 (e.g., a detector circuit). For convenience, FIG. 1A and FIG. 1B illustrate that the panel driver 210 and the input detector 220 are separate from one another, but the present invention is not limited thereto. For example, at least a portion of the input detector 220 may be integrated with the panel driver 210, or may operate remote from the panel driver 210.

In an embodiment, the panel driver 210 supplies the data signal DS corresponding to image data to the pixels PXL while sequentially scanning the pixels PXL of the display area AA. In this embodiment, the display panel 100 may display an image corresponding to the image data.

In the embodiment, the panel driver 210 may supply a driving signal for fingerprint sensing to one or more of the pixels PXL. Here, the driving signal may be provided to a pixel PXL so that the pixel PXL emits light to operate as a light source for the sensor pixel SPXL. In this embodiment, the driving signal for measuring fingerprint sensing may be provided to a pixel PXL located in a specific area within the display panel DP (for example, the pixel PXL located in the input sensing area FSA).

In the embodiment, image data corresponding to the input sensing area FSA may be provided or controlled by the input detector 220. For example, during an input sensing operation, the input detector 220 may provide image data corresponding to an image to be displayed in the input sensing area FSA or a control signal IPD to the panel driver 210.

In addition, a driving signal for fingerprint sensing may be provided to the sensor pixel SPXL by the input detector 220.

The input detector 220 may transmit a driving signal (for example, a driving voltage) for driving the sensor pixel SPXL to the sensor pixel SPXL, and may detect a user input based on an electrical signal received from the sensor pixel SPXL. For example, the input detector 220 may detect a user's fingerprint or palm print based on the sensing signal SS supplied from the sensor pixel SPXL (or a sensor array including the sensor pixel SPXL).

The input detector 220 and the sensor pixels SPXL may be referred to as an input sensing device.

Figure 2A:
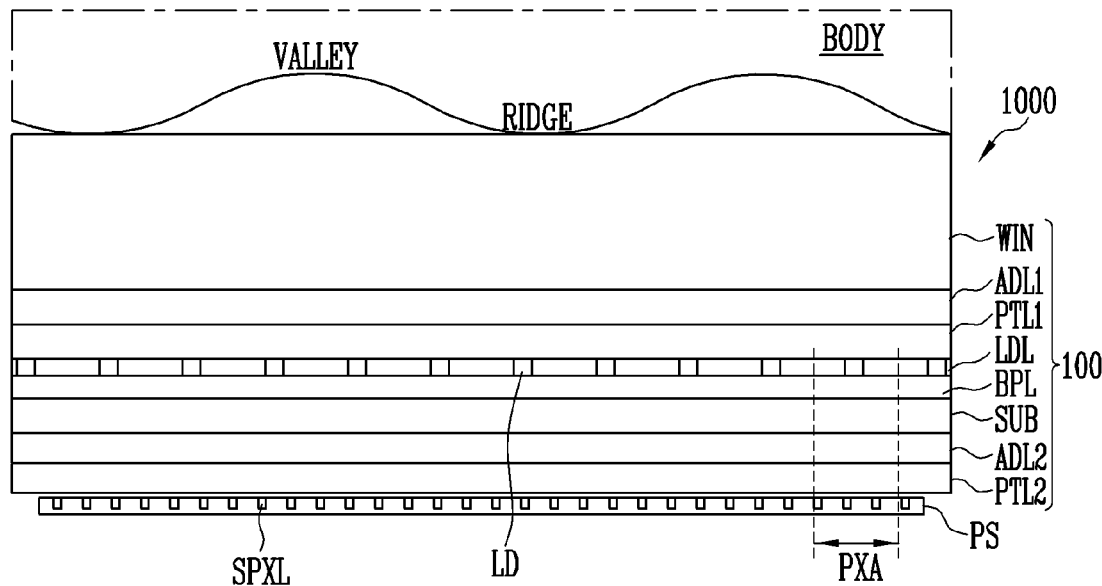
FIG. 2A illustrates a cross-sectional view of an example of the display device of FIG. 1A.

FIG. 2A illustrates a cross-sectional view of an example of the display device of FIG. 1A. FIG. 2A illustrates a cross-section in the input sensing area FSA of the display device 1000 of FIG. 1A and FIG. 1B.

Referring to FIG. 1A to FIG. 2A, the display device 1000 includes the display panel 100 in the input sensing area FSA and a sensor array PS (or input sensing panel) disposed on one surface of the display panel 100. In addition, the display device 1000 may include a substrate SUB, and a circuit element layer BPL, a light emitting element layer LDL, a first passivation layer PTL1, a first adhesive layer ADL1, and a window WIN that are sequentially disposed on a first surface (for example, an upper surface) of the substrate SUB. In addition, the display device 1000 may include a second adhesive layer ADL2 and a second passivation layer PTL2 that are sequentially disposed on a second other surface (for example, a lower surface) of the substrate SUB.

The substrate SUB is a base substrate for the display panel 100, and may be a substantially transparent transmissive substrate. The substrate SUB may be a rigid substrate including glass or tempered glass, or a flexible substrate made of a plastic material. However, the material of the substrate SUB is limited thereto, and the substrate SUB may be made of various materials.

The circuit element layer BPL may be disposed on one surface of the substrate SUB, and may include at least one conductive layer. For example, the circuit element layer BPL may include a plurality of circuit elements representing a pixel circuit of the pixel PXL, and wires for supplying various power sources and signals for driving the pixel PXL. In an embodiment, the circuit element layer BPL may include various circuit elements such as at least one transistor and capacitor, and a plurality of conductive layers for forming wires connected to the various circuit elements. In addition, the circuit element layer BPL may include at least one insulation layer provided between the plurality of conductive layers.

The light emitting element layer LDL may be disposed on one surface of the circuit element layer BPL. The light emitting element layer LDL may include a light emitting element LD (or a plurality of light emitting elements) connected to circuit elements and/or wires of the circuit element layer BPL through a contact hole. In an embodiment, at least one light emitting element LD may be provided for the pixel PXL (or a pixel area PXA). For example, the light emitting element LD may be configured as an organic light emitting element, or an inorganic light emitting element such as a micro light emitting diode (LED) or a quantum dot LED. In addition, the light emitting element LD may be a light emitting element configured of a combination of an organic material and an inorganic material.

The pixel PXL may include circuit elements disposed on the circuit element layer BPL and at least one light emitting element LD disposed on the light emitting element layer LDL on the circuit element layer BPL.

The first passivation layer PTL1 may be disposed on the light emitting element layer LDL to cover the display area AA. The first passivation layer PTL1 may include a sealing member such as a thin film encapsulation (TFE) or encapsulation substrate, and may additionally include a protective film in addition to the sealing member.

The first adhesive layer ADL1 is disposed between the first passivation layer PTL1 and the window WIN to combine the first passivation layer PTL1 and the window WIN. The first adhesive layer ADL1 may include a transparent adhesive such as an optically clear adhesive (OCA) and an optically clear resin (OCR), and may include various adhesive materials.

The window WIN may be a protective member disposed at an uppermost portion of a module of the display device 1000 including the display panel 100, and may be a substantially transparent transmissive substrate. The window WIN may have a multi-layered structure including at least one of a glass substrate, a plastic film, and a plastic substrate. The window WIN may include a rigid or flexible substrate, but the material included in the window WIN is not limited thereto.

The display device 1000 may further include a polarizing plate, an anti-reflection layer, and/or a touch sensor layer (touch electrode layer). For example, the display device 100 may further include a polarizing plate and/or touch sensor layer disposed between the first passivation layer PTL1 and the window WIN.

The second passivation layer PTL2 may be disposed on the other surface of the substrate SUB. The second passivation layer PTL2 may be bonded to the substrate SUB by the second adhesive layer ADL2.

The second adhesive layer ADL2 may firmly bond (or attach) the substrate SUB and the second passivation layer PTL2. The second adhesive layer ADL2 may include a transparent adhesive such as OCA. The second adhesive layer ADL2 may include a pressure sensitive adhesive (PSA) that acts as an adhesive material when pressure to adhere to an adhesive surface is applied thereto.

The second passivation layer PTL2 blocks oxygen and/or a moisture from being introduced from the outside, and may be formed as a single layer or multilayer. The second passivation layer PTL2 may be formed in a film form to further secure flexibility of the display panel 100. The second passivation layer PTL2 may be combined with the sensor array PS through another adhesive layer (not shown) including a transparent adhesive such as OCA.

A selective light blocking film may be further located under the second passivation layer PTL2. In an exemplary embodiment, the selective light blocking film blocks light of a specific frequency band (for example, infrared) among external light introduced to the display device 1000 to prevent the light from being incident on the sensor pixel SPXL of the sensor array PS. In an exemplary embodiment, the selective light blocking film blocks light above a certain wavelength and allows light at and below the certain wavelength to pass therethrough. In an embodiment, the certain wavelength is 500 nm, 600 nm, or the wavelength of infrared light. It has been described that the selective light blocking film is further located under the second passivation layer PTL2, but the present invention is not limited thereto.

The sensor array PS may be attached to another surface (for example, rear surface) of the display panel 100 through an adhesive so as to overlap at least one area of the display panel 100. For example, the sensor array PS may be disposed to overlap the display panel 100 in the input sensing area FSA. The sensor array PS may include the sensor pixel SPXL (or a plurality of sensor pixels) distributed at a predetermined resolution and/or intervals.

In an exemplary embodiment, although not shown, an optical system providing a light path by condensing light directed to the sensor array PS may be provided on the sensor array PS. A width of a light transmitting portion that guides light in the optical system may be determined in consideration of sensing precision and light conversion efficiency. A condensing rate of light incident on the sensor array PS may be improved by the optical system. The optical system may be formed of an optical fiber or silicon.

The sensor pixels SPXL may have an appropriate number, size, and arrangement so that an identifiable fingerprint image may be generated from electrical signals outputted by the sensor pixels SPXL. Intervals between the sensor pixels SPXL and other sensors pixels may be densely set so that light reflected from a sensed target object (for example, fingerprint) may be incident on at least two adjacent sensor pixels SPXL.

The sensor pixel SPXL may sense external light to output a corresponding electrical signal, for example, a voltage signal. A reflected light incident on the sensor pixel SPXL may have an optical characteristic (for example, frequency, wavelength, size, etc.) due to valley and ridges formed in a user's body (for example, a finger). Therefore, the sensor pixel SPXL may output the sensing signal SS corresponding to the optical characteristic of the reflected light.

The sensing signal SS outputted from the sensor pixel SPXL may be converted into image data by the input detector 220, and may be used for a user's identification (for example, fingerprint authentication).

Figure 2B:
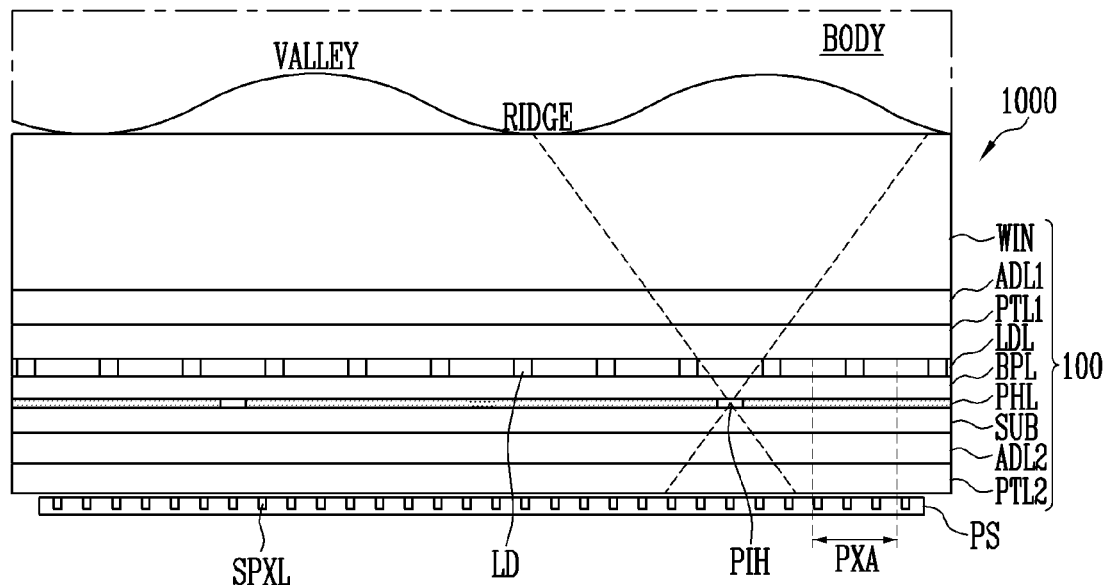
FIG. 2B illustrates a cross-sectional view of an example of the display device of FIG. 1A.

FIG. 2B illustrates a cross-sectional view of an example of the display device of FIG. 1A.

Referring to FIG. 1A, FIG. 2A, and FIG. 2B, the display device 1000 further includes a light blocking layer PHL including a pinhole PIH. In other words, it has a structure in which a pinhole (PIH) type is applied as an optical system, and the optical system is positioned inside the display panel 100. The light blocking layer PHL may be disposed within the display panel 100 or between the display panel 100 and the sensor pixel SPXL, and block a portion of light incident to the sensor pixel SPXL. For example, a portion of the light incident on the light blocking layer PHL may be blocked, and the remaining portion thereof may pass through the pinhole PIH to reach a sensor pixel SPXL under the light blocking layer PHL.

The pinhole PIH may mean an optical hole, and may be a kind of light-transmitting hole. For example, the pinhole PIH may be a light-transmitting hole having the smallest size (or area) among light-transmitting holes in which layers of the display device 1000 are formed by overlapping each other, on a path that the reflected light passes through the display panel 100 in a diagonal or vertical direction to be incident on the sensor pixel SPXL. In an exemplary embodiment, the pinhole PIH is a through-hole.

The pinhole PIH may have a predetermined width, for example, a width having a range of 5 μm to 20 μm. Accordingly, as it moves away from the light blocking layer PHL (that is, as it moves in an upper or lower direction of the light blocking layer PHL), a width of an optical opening area to be secured in each layer of the display device 1000 may gradually increase.

A width (or diameter) of the pinhole PIH may be set to be approximately 10 times or more of a wavelength of the reflected light. For example, the width or diameter may be set to be approximately 4 μm or 5 μm or more to prevent light diffraction. In addition, the width of the pinhole PIH may be set to a size sufficient to prevent image blur and to sense a shape of a fingerprint more clearly. For example, the width of the pinhole PIH may be set to approximately 15 μm or less. However, the present invention is not limited thereto, and the width of the pinhole PIH may vary depending on a wavelength band of reflected light and/or a thickness of each layer of a module.

In an exemplary embodiment, only reflected light passing through the pinhole PIH reaches the sensor pixel SPXL of the sensor array PS. A phase of light reflected from the fingerprint by the pinhole PIH having a very narrow width and a phase of an image formed on the sensor array PS may have a difference of 180 degrees.

The sensor pixel SPXL may output the sensing signal SS corresponding to the reflected light passing through the pinhole PIH, for example, a voltage signal.

However, this is exemplary, and the configuration, arrangement, and driving method of the sensor array PS for detecting the reflected light from a fingerprint is not limited to the sensor array PS shown in FIG. 2A or FIG. 2B.

Figure 3:
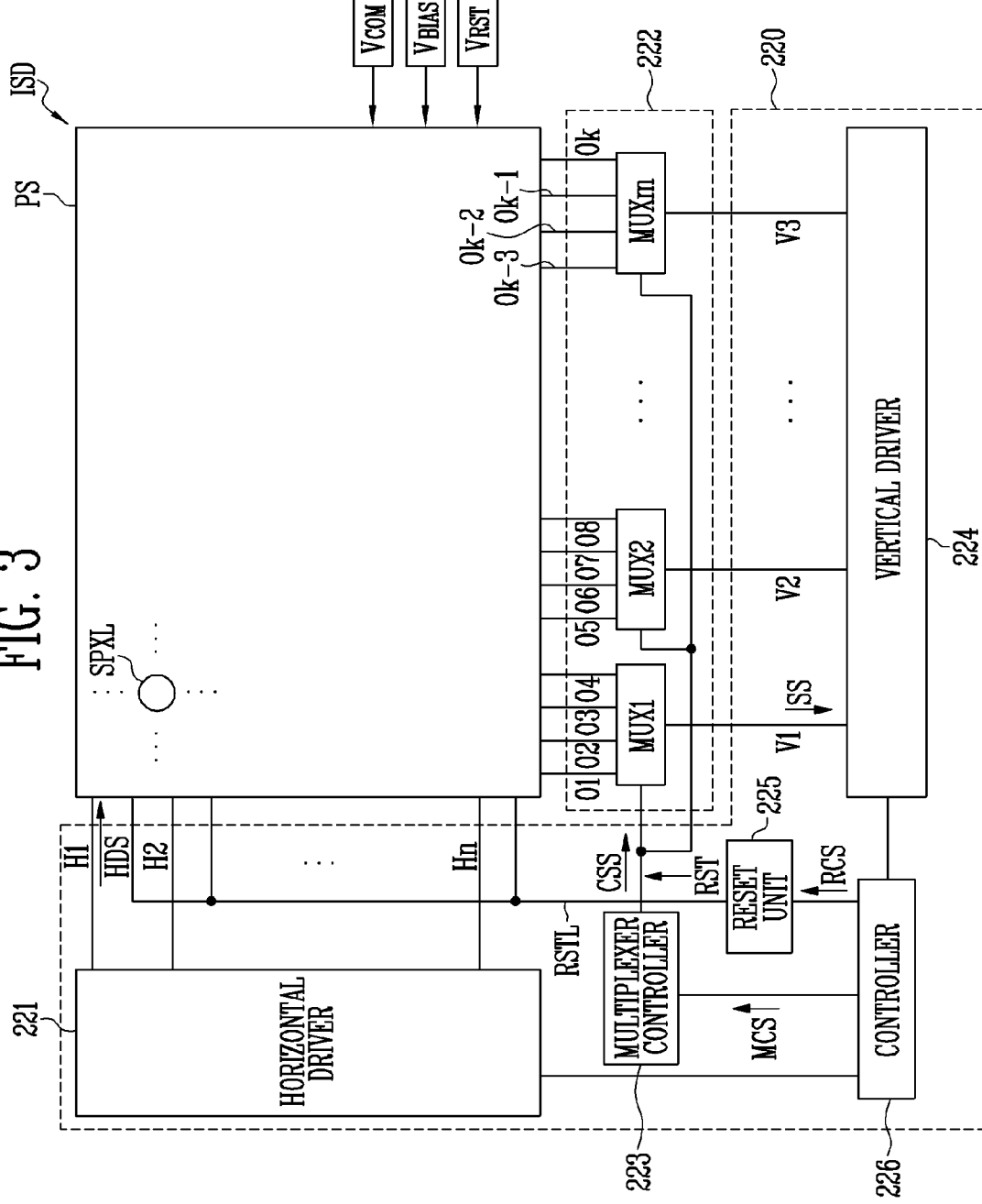
FIG. 3 illustrates a block diagram of an example of an input sensing device included in the display device of FIG. 1A or FIG. 1B.

FIG. 3 illustrates a block diagram of an example of an input sensing device that may be included in the display device of FIG. 1A or FIG. 1B. In an exemplary embodiment, an input sensing device ISD includes a sensor array PS, an input detector 220, and multiplexers 222.

Referring to FIG. 1A, 1B, and FIG. 3, the sensor array PS (or an input sensing panel) may include a plurality of sensor pixels SPXL. In the embodiment, the sensor pixels SPXL may be arranged in a two-dimensional array, but the present invention is not limited thereto. The sensor pixel SPXL may include a photoelectric element that photoelectrically converts incident light into a charge according to an amount of the light. In an embodiment, the photoelectric element is a photodiode. In an embodiment, the sensor array PS may receive a reset voltage VRST, a bias voltage VBIAS, and a common voltage VCOM for driving the sensor pixel SPXL from the outside.

The input detector 220 includes a horizontal driver 221 (e.g., a driver circuit), a multiplexer controller 223 (e.g., a control circuit), a vertical driver 224 (e.g., a driver circuit), a reset unit 225 (e.g., a reset circuit), and a controller 226 (e.g., a control circuit).

The horizontal driver 221 may be connected to the sensor pixel SPXL through driving lines H1 to Hn (where n is an integer greater than or equal to 2). The horizontal driver 221 may include a shift register or an address decoder. In an exemplary embodiment, the horizontal driver 221 sequentially applies a driving signal (or driving signals) to the driving lines H1 to Hn. Here, the driving signal may be a signal for selectively driving the sensor pixel SPXL. For example, the horizontal driver 221 may apply a driving signal in a sensor pixel row unit. For example, the horizontal driver 221 may apply a first driving signal to a first row of sensor pixels at a first time, apply a second driving signal to a second row of sensor pixels at a second time, etc., until each row has received a driving signal.

The sensor pixel SPXL selected and driven by the horizontal driver 221 senses light by using an internal photoelectric element, and outputs an electrical signal corresponding to the sensed light (that is, the sensing signal SS), for example, a voltage signal. The electrical signal can be an analog signal.

The sensor array PS may provide the sensing signal SS to the multiplexers 222 through signal input lines O1 to Ok.

The multiplexers 222 may receive the sensing signal SS from the sensor array PS, and supply the sensing signal SS to the vertical driver 224. For example, the multiplexers 222 may receive the sensing signal SS through the signal input lines O1 to Ok, and may time-divisionally output the sensing signal SS to output lines V1 to Vm, where the number m is smaller than the number k of the signal input lines O1 to Ok.

FIG. 3 shows the case in which the number of signal input lines O1 to Ok is four times the number of output lines V1 to Vm (where m is an integer greater than or equal to 2), but a ratio of the signal input lines O1 to Ok and the output lines V1 to Vm may vary depending on a structure of the multiplexers 222.

The multiplexer controller 223 may control an operation of the multiplexers 222 through a sensing signal control signal CSS. For example, the sensing signal control signal CSS may serve to control an operation of transistors included in each of the multiplexers 222. The sensing signal control signal CSS may include a plurality of sub-control signals, where each of the multiplexers receives a distinct one of the sub-control signals.

The vertical driver 224 may receive the sensing signal SS through the output lines V1 to Vm. The vertical driver 224 may process the signal outputted from the sensor pixel SPXL.

For example, the vertical driver 224 may perform correlated double sampling (CDS) processing to remove noise from an electrical signal provided from the signal sensor pixel SPXL. In addition, the vertical driver 224 may convert an analog type of electrical signal into a digital type of signal. In the embodiment, an analog-digital converter is provided for each of the output lines V1 to Vm, and may process electrical signals (or analog signals) provided from the output lines V1 to Vm in parallel.

The reset unit 225 may be connected to all of the sensor pixels SPXL provided in the sensor array PS through one reset control line RSTL. The reset unit 225 may simultaneously apply a reset signal RST to all of the sensor pixels SPXL. Here, the reset signal RST may be a signal for applying the reset voltage VRST to the sensor pixel SPXL.

The controller 226 may control the horizontal driver 221, the multiplexer controller 223, the vertical driver 224, and the reset unit 225.

In an embodiment, the controller 226 provides a clock signal, and a control signal (for example, a start pulse) to the horizontal driver 221. In this embodiment, the horizontal driver 221 generates a horizontal driving signal HDS for selecting and driving the sensor pixel SPXL based on signals provided from the controller 226.

The controller 226 may provide a multiplexer control signal MCS to the multiplexer controller 223. The multiplexer controller 223 may receive the multiplexer control signal MCS, and generate a sensing signal control signal CSS based on the received multiplexer control signal MCS.

In an embodiment, the controller 226 provides a clock signal and a control signal to the vertical driver 224. In this embodiment, the vertical driver 224 periodically samples the sensing signal SS provided from the sensor pixel SPXL based on the clock signal and the control signal, and converts the sampled signal into a digital type of sensing data signal.

In an exemplary embodiment, the controller 226 generates image data corresponding to the sensing signal SS received by the vertical driver 224, and processes the generated image data. In addition, the controller 226 may detect an input (for example, a fingerprint or a palm print) from the processed image data, and may authenticate the detected input or transmit it to the outside.

However, this is exemplary, and the image data generation and input detection need not be performed by the controller 226, but may be performed by an external host processor.

In an embodiment, the controller 226 provides a reset driver control signal RCS to the reset unit 225. The reset unit 225 may receive the reset driver control signal RCS, and generate a reset signal RST based on the received reset driver control signal RCS.

While FIG. 3 illustrates an embodiment where the horizontal driver 221, the multiplexer controller 223, the vertical driver 224, the reset unit 225, and the controller 226 are independently configured, the present invention is not limited thereto. For example, the multiplexer controller 223, the vertical driver 224, the reset unit 225, and the controller 226 may be implemented as one integrated circuit, and the horizontal driver 221 may be formed in the sensor array PS through the same process as the sensor pixel SPXL.

Figure 4:
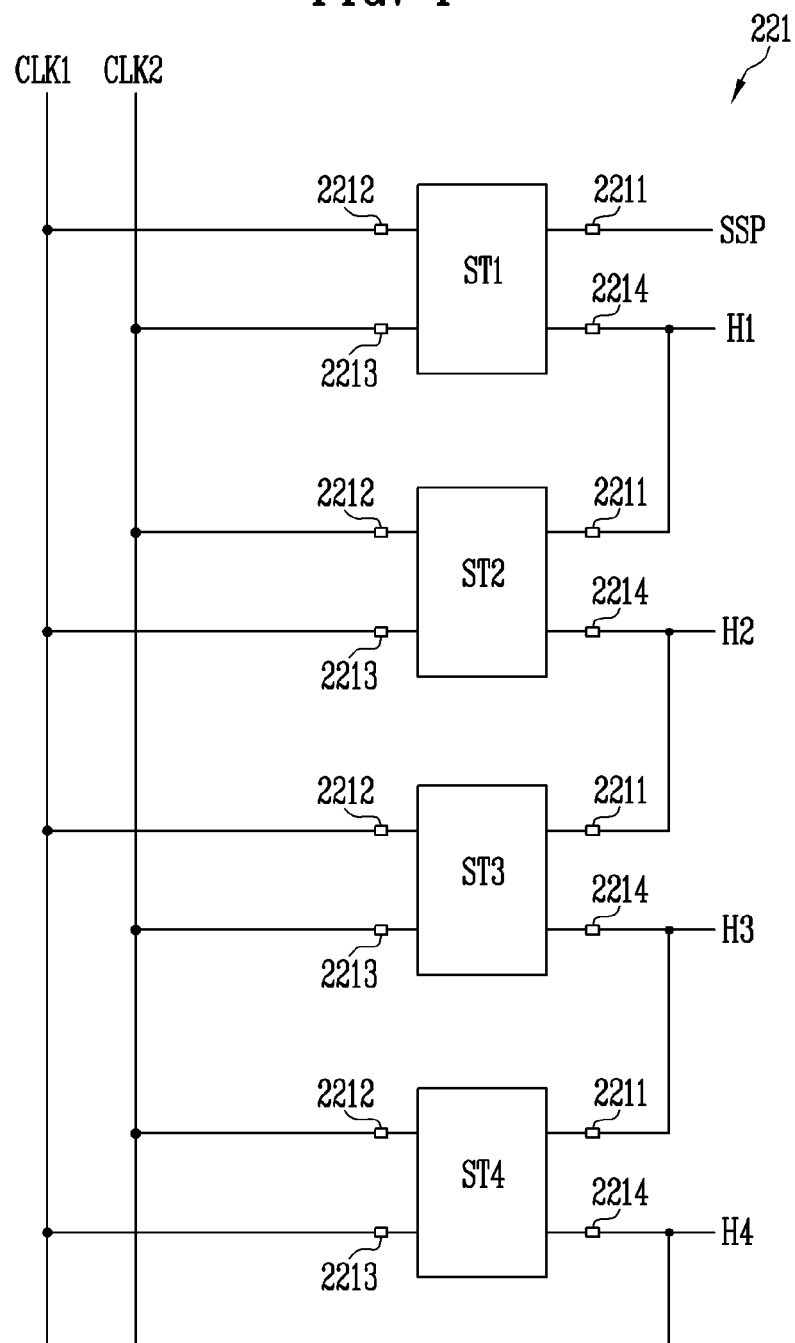
FIG. 4 illustrates a scan driver shown in FIG. 3 according to an exemplary embodiment of the invention.

FIG. 4 illustrates an embodiment of the horizontal driver shown in FIG. 3. For better comprehension and ease of description, FIG. 4 illustrates four stages.

Referring to FIG. 4, the horizontal driver 221 according to the embodiment of the present invention may include a plurality of stages ST1 to ST4. Each of the stages ST1 to ST4 is connected to one of the driving lines H1 to H4, and is driven corresponding to clock signals CLK1 and CLK2. In an exemplary embodiment, each of the stages ST1 to ST4 is implemented by a same circuit.

In an exemplary embodiment, each of the stages ST1 to ST4 includes a first input terminal 2211, a second input terminal 2212, a third input terminal 2213 and an output terminal 2214.

A first input terminal 2211 of each of stages ST1 to ST4 may receive an output signal (that is, driving signal) of a previous stage or a start signal SSP. For example, the first input terminal 2211 of the first stage ST1 receives the start signal SSP, and the first input terminal 2211 of the remaining stages ST2 to ST4 receives the output signal of the previous stage.

A second input terminal 2212 of an i-th stage STi (i is an odd or even number) receives the first clock signals CLK1, and the third input terminal 2213 of the i-th stage STi receives the second clock signal CLK2. The second input terminal 2212 of an (i+1)-th stage STi receives the second clock signals CLK2, and the third input terminal 2213 of the (i+1)-th stage receives the first clock signal CLK1.

In an exemplary embodiment, the first clock signal CLK1 and the second clock signal CLK2 have the same period, and their phases do not overlap each other. For example, when a period in which a driving signal is supplied to one driving line is referred to as 1 horizontal period 1H, each of the clock signals CLK1 and CLK2 has a period of 2H, and may be supplied to different horizontal periods.

Figure 5:
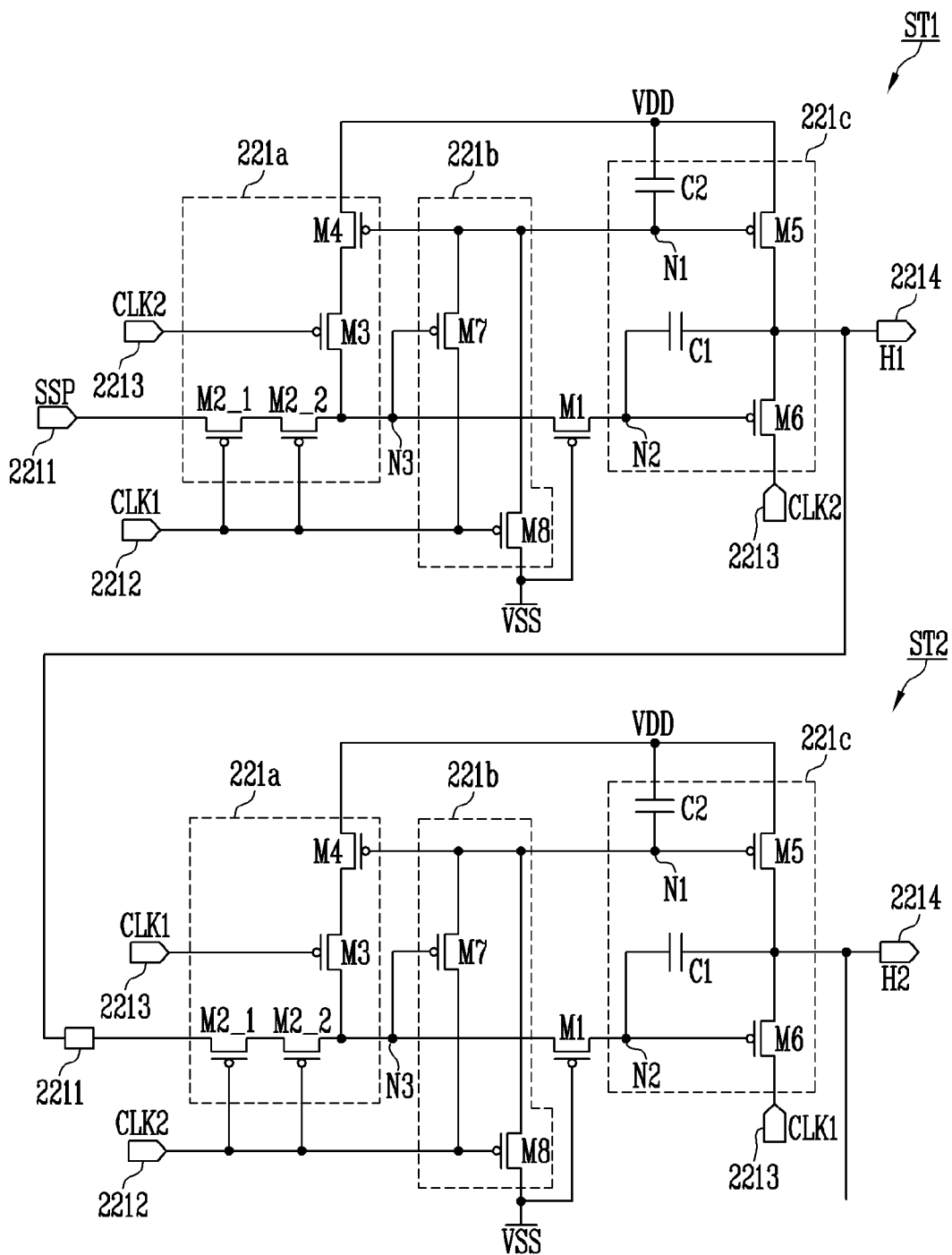
FIG. 5 illustrates a circuit diagram of a stage shown in FIG. 4 according to an exemplary embodiment of the invention.

FIG. 5 illustrates a circuit diagram of the stage shown in FIG. 4 according to an exemplary embodiment of the invention. For better understanding and ease of description, FIG. 5 illustrates the first stage ST1 and the second stage ST2. In addition, while FIG. 5 illustrates transistors being P-channel metal-oxide-semiconductor (PMOS) transistors, the present invention is not limited thereto. For example, the transistors could instead be N-channel metal-oxide-semiconductor (NMOS) transistors.

Referring to FIG. 5, the stage ST1 according to an exemplary embodiment of the present invention includes a first driver 221a, a second driver 221b, an output unit 221c (e.g., an output circuit), and a first transistor M1.

The output unit 221c may control a voltage supplied to the output terminal 2214 in response to a voltage applied to a first node N1 and a second node N2. In an exemplary embodiment, the output unit 221c includes a fifth transistor M5, a sixth transistor M6, a first capacitor C1, and a second capacitor C2 to control the voltage supplied to the output terminal 2214.

The fifth transistor M5 is positioned between a first power source VDD and the output terminal 2214, and a gate electrode thereof is connected to the first node N1. The fifth transistor M5 may control a connection between the first power source VDD and the output terminal 2214 in response to a voltage applied to the first node N1. Here, the first power source VDD is set to a gate-off voltage, for example, a high level voltage.

The sixth transistor M6 is positioned between the output terminal 2214 and the third input terminal 2213, and a gate electrode thereof is connected to the second node N2. The sixth transistor M6 may control a connection of the output terminal 2214 and the third input terminal 2213 in response to a voltage applied to the second node N2.

The first capacitor C1 is connected between the second node N2 and the output terminal 2214. The first capacitor C1 may be charged with a voltage based on a turn-on and turn-off of the sixth transistor M6.

The second capacitor C2 is connected between the first node N1 and the first power source VDD. The second capacitor C2 may be charged with a voltage applied to the first node N1.

The first driver 221a may control a voltage of the third node N3 in response to signals supplied to the first input terminal 2211 to the third input terminal 2213. In an exemplary, the first driver 221a includes a second transistor, a third transistor M3, and a fourth transistor M4 to control a voltage of the third node N3.

FIG. 5 illustrates the second transistor including second transistors M2_1 and M2_2 positioned between the first input terminal 2211 and the third node N3, and gate electrodes thereof are connected to the second input terminal 2212. These second transistors M2_1 and M2_2 may control a connection between the first input terminal 2211 and the third node N3 in response to a signal supplied to the second input terminal 2212. The gates of the second transistors M2_1 and M2_2 of the first stage ST1 receive the first clock signal CLK1 and the gates of the second transistors M2_1 and M2_2 of the second stage ST2 receive the second clock signal CLK. In an exemplary embodiment, the second transistors M2_1 and M2_2 is replaced with a single transistor or one of the second transistors M2_1 and M2_2 is omitted.

The third transistor M3 and the fourth transistor M4 are connected in series between the third node N3 and the first power source VDD. The third transistor M3 is positioned between the fourth transistor M4 and the third node N3, and a gate electrode thereof is connected to the third input terminal 2213. The third transistor M3 may control a connection between the fourth transistor M4 and the third node N3 in response to a signal supplied to the third input terminal 2213. A gate electrode of the third transistor M3 of the first stage ST1 receives the second clock signal CK2 and a gate electrode of the third transistor M3 of the second stage ST2 receives the first clock signal CK1.

The fourth transistor M4 is positioned between the third transistor M3 and the first power source VDD, and a gate electrode thereof is connected to the first node N1. The fourth transistor M4 may control a connection between the third transistor M3 and the first power source VDD in response to a voltage of the first node N1.

The second driver 221b may control a voltage of the first node N1 in response to voltages of the second input terminal 2212 and the third node N3. In an exemplary embodiment, the second driver 221b includes a seventh transistor M7 and an eighth transistor M8 to control a voltage of the first node N1.

The seventh transistor M7 is positioned between the first node N1 and the second input terminal 2212, and a gate electrode thereof is connected to the third node N3. The seventh transistor M7 may control a connection between the first node N1 and the second input terminal 2212 in response to the voltage of the third node N3.

The eighth transistor M8 is positioned between the first node N1 and a second power source VSS, and a gate electrode thereof is connected to the second input terminal 2212. The eighth transistor M8 may control a connection between the first node N1 and the second power source VSS in response to a signal of the second input terminal 2212. Here, the second power source VSS is set to a gate-on voltage, for example, a low level voltage.

The first transistor M1 is positioned between the third node N3 and the second node N2, and a gate electrode thereof is connected to the second power source VSS. The first transistor M1 may maintain electrical connection between the third node N3 and the second node N2 while maintaining a turn-on state. Additionally, the first transistor M1 may limit a voltage drop of the third node N3 in response to a voltage of the second node N2. In other words, even when the voltage of the second node N2 decreases to a voltage lower than that of the second power source VSS, the voltage of the third node N3 does not decrease to a voltage lower than the voltage obtained by subtracting a threshold voltage of the first transistor M1 from the second power source VSS.

Figure 6A:
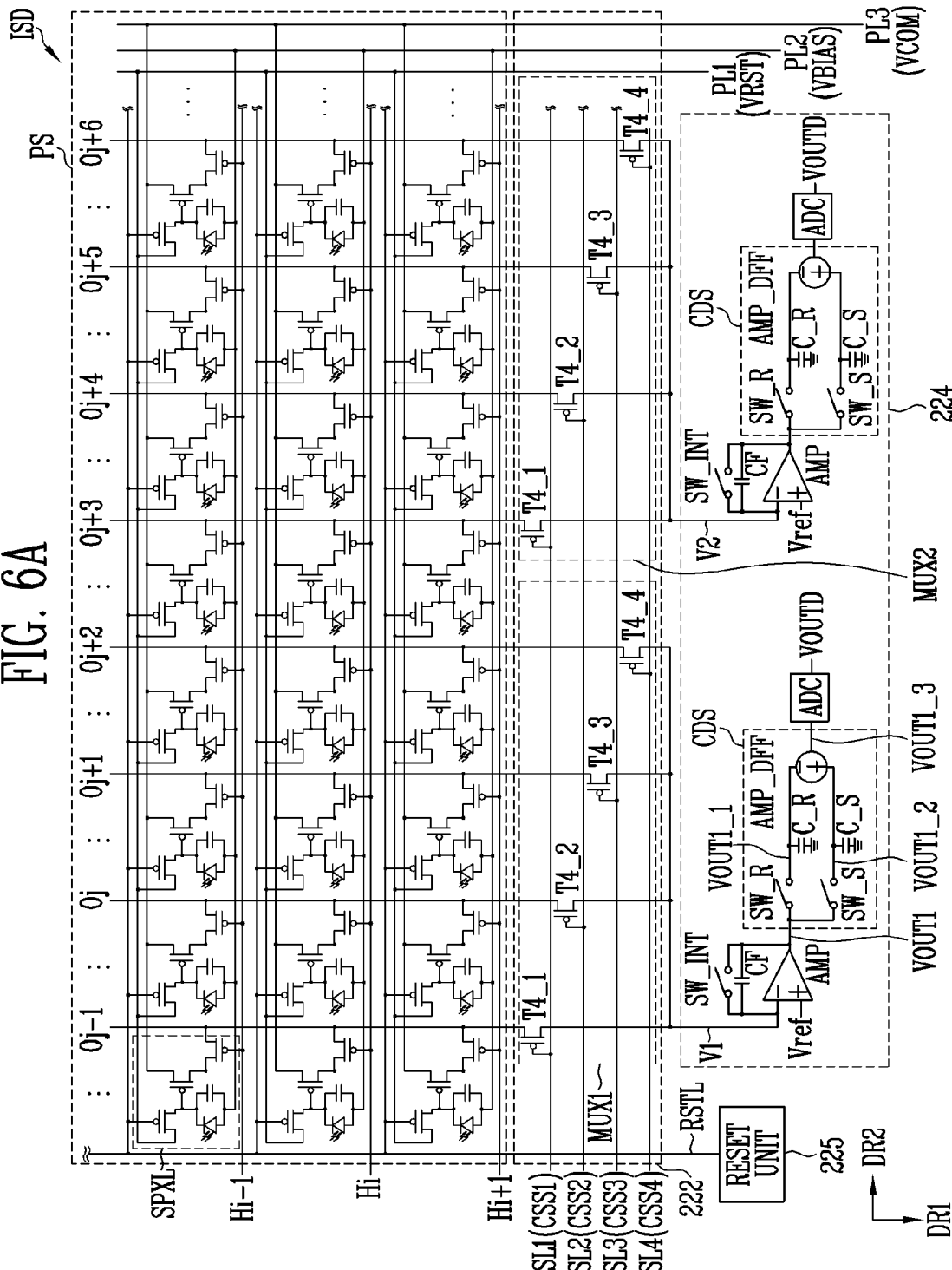
FIG. 6A and FIG. 6B illustrate circuit diagrams of an example of the input sensing device of FIG. 3.
Figure 6B:
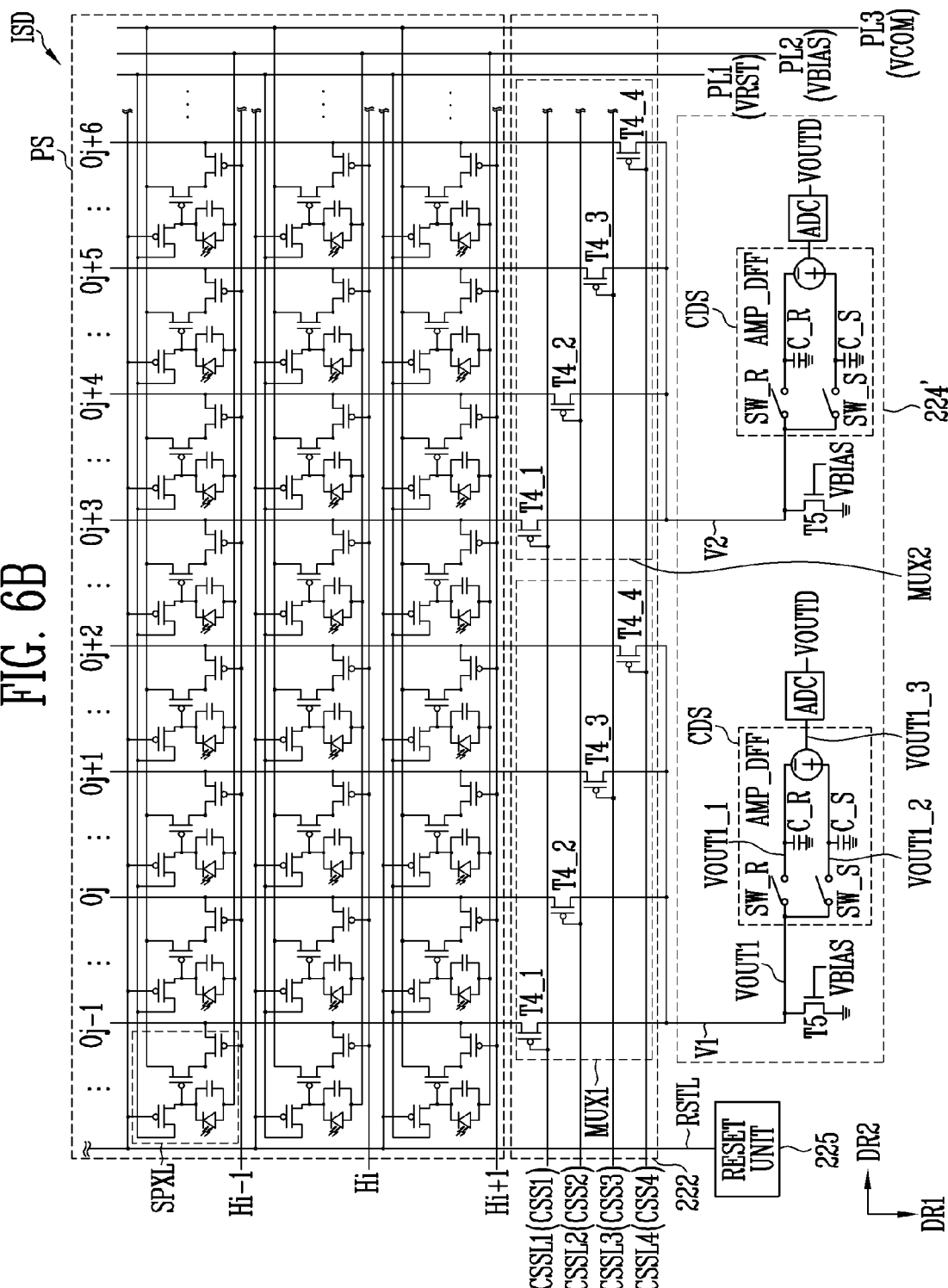
Figure 7:
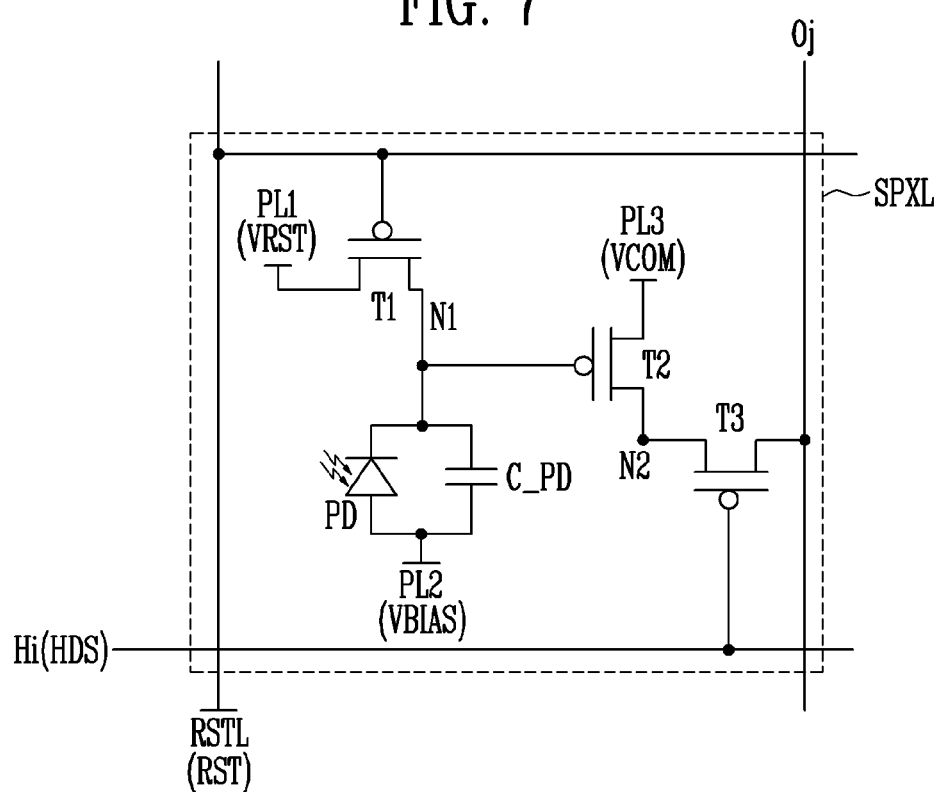
FIG. 7 illustrates an example of a sensor pixel included in the input sensing device of FIG. 6A.

FIG. 6A and FIG. 6B illustrate circuit diagrams of an example of the input sensing device of FIG. 3. FIG. 6A schematically illustrates the input sensing device ISD, based on the sensor pixels SPXL included in (i−1)-th to (i+1)-th sensor pixel rows (where i is a positive integer smaller than n) and (j−1)-th to (j+5)-th sensor pixel columns (where j+5 is a positive integer smaller than k), the multiplexers 222 connected to the sensor pixels SPXL, the reset unit 225, and the vertical driver 224 connected to the multiplexers 222. FIG. 7 illustrates an example of a sensor pixel included in the input sensing device of FIG. 6A. FIG. 7 illustrates the sensor pixels SPXL included in an i-th sensor pixel row and a j-th sensor pixel column.

Referring to FIG. 3 to FIG. 7, the input sensing device ISD (or sensor array PS) includes horizontal driving lines Hi−1, Hi, and Hi+1, signal input lines Oj−1, Oj, Oj+1, Oj+2, Oj+3, Oj+4, and Oj+6, the reset control line RSTL, a reset voltage power line PL1, a bias voltage power line PL2, a common voltage power line PL3, and the sensor pixels SPXL connected to each of them.

The horizontal driving lines Hi−1, Hi, and Hi+1 may extend in a second direction DR2, and may be arranged along a first direction DR1 crossing the second direction DR2.

The signal input lines Oj−1, Oj, Oj+1, Oj+2, Oj+3, Oj+4, and Oj+6 may entend in the first direction DR1, and may be arranged along the second direction DR2.

The reset voltage VRST may be applied to the reset voltage power line PL1.

The bias voltage VBIAS may be applied to the bias voltage power line PL2.

The common voltage VCOM may be applied to the common voltage power line PL3.

The sensor pixels SPXL may be electrically connected to the driving lines Hi−1, Hi, and Hi+1, the signal input lines Oj−1, Oj, Oj+1, Oj+2, Oj+3, Oj+4, and Oj+6, the reset voltage power line PL1, the bias voltage power line PL2, and the common voltage power line PL3.

Since the sensor pixels SPXL are substantially equivalent to each other, the sensor pixels SPXL will be described by using the sensor pixel SPXL included in the i-th sensor pixel row and the j-th sensor pixel column.

Referring to FIG. 7, in an exemplary embodiment, the sensor pixel SPXL includes a photodiode PD, a capacitor C_PD, a first transistor T1, a second transistor T2, and a third transistor T3.

The sensor pixel SPXL is connected to the reset voltage power line PL1, the bias voltage power line PL2, the common voltage power line PL3, the i-th horizontal driving line Hi, and the j-th signal input line Oj, and may transmit a photoelectrically converted charge in response to the horizontal driving signal HDS (or, a sensing signal SS (see FIG. 1A)) provided through the i-th driving line Hi to the j-th signal input line Oj.

The first transistor T1 includes a first electrode connected to the reset voltage power line PL1, a second electrode connected to the first node N1, and a gate electrode connected to the reset control line RSTL.

According to an embodiment, the first transistor T1 is connected between the reset voltage power line PL1 and the first node N1, and is turned on in response to the reset signal RST (for example, a signal of a gate-on voltage level that turns on a transistor) provided through the reset control line RSTL. In this embodiment, a potential of the first node N1 becomes the reset voltage VRST. That is, the first transistor T1 may initialize the photodiode PD to the reset voltage VRST.

The photodiode PD is electrically connected between the bias voltage power line PL2 and the first node N1, and may generate a charge (or current) based on light incident thereon. That is, the photodiode PD may perform a photoelectric conversion function. For example, an anode electrode of the photodiode PD is connected to the bias voltage power line PL2, a cathode electrode of the photodiode PD is electrically connected to the first node N1, and the photodiode PD may perform the photoelectric conversion function after the reset voltage VRST is applied to the first node N1.

The capacitor C_PD is electrically connected between the bias voltage power line PL2 and the first node N1, and may temporarily store a charge (or current) generated by the photodiode PD. For example, one electrode of the capacitor C_PD may be connected to the bias voltage power line PL2, and the other electrode of the capacitor C_PD may be electrically connected to the first node N1.

In an embodiment, the second transistor T2 includes a first electrode connected to the common voltage power line PL3, a second electrode connected to the second node N2, and a gate electrode connected to the first node N1. According to the embodiment, when the photoelectric conversion function of the photodiode PD is performed, a potential of the first node N1 may be changed in proportion to an amount of a charge (or current) generated based on light incident thereon. That is, a gate electrode bias of the second transistor T2 is changed. This eventually leads to a change in the potential of the second node N2 (or the second electrode of the second transistor T2).

In an embodiment, the third transistor T3 includes a first electrode connected to the second node N2, a second electrode electrically connected to the j-th signal input line Oj, and a gate electrode connected to the i-th driving line Hi.

That is, the third transistor T3 is electrically connected between the second node N2 and the signal input line Oj, and may be turned on in response to the horizontal driving signal HDS (for example, a driving signal of a gate-on voltage level that turns on a transistor) provided through the i-th driving line Hi to transmit a charge of the second node N2 to the j-th signal input line Oj.

FIG. 7 illustrates an example in which the transistors T1, T2, and T3 are P-type transistors, but at least some of the transistors T1, T2, and T3 may be an N-type transistor, and correspondingly, a circuit structure of the sensor pixel SPXL may be variously modified.

Referring back to FIG. 6A, the multiplexers 222 may be disposed between the sensor array PS and the vertical driver 224. Since the multiplexers 222 substantially operate the same, for better understanding and ease of description, a first multiplexer MUX1 connected to a first output line V1 will be mainly described. The multiplexers 222 may be referred to as a selection circuit.

According to an exemplary embodiment, the first multiplexer MUX1 includes a (4_1)-th transistor T4_1, a (4_2)-th transistor T4_2, a (4_3)-th transistor T4_3, and a (4_4)-th transistor T4_4.

The (4_1)-th transistor T4_1 may be connected between the (j−1)-th signal input line Oj−1 and the first output line V1. For example, the (4_1)-th transistor T4_1 may include a first electrode connected to the (j−1)-th signal input line Oj−1, a second electrode connected to the first output line V1, and a gate electrode connected to a first sensing signal control line CSSL1.

The (4_1)-th transistor T4_1 may be turned on in response to a first sensing signal control signal CSS1. For example, the (4_1)-th transistor T4_1 may receive the first sensing signal control signal CSS1 from the multiplexer controller 223 through the first sensing signal control line CSSL1.

The (4_2)-th transistor T4_2 may be connected between the j-th signal input line Oj and the first output line V1. For example, the (4_2)-th transistor T4_2 may include a first electrode connected to the j-th signal input line Oj, a second electrode connected to the first output line V1, and a gate electrode connected to a second sensing signal control line CSSL2.

The (4_2)-th transistor T4_2 may be turned on in response to a second sensing signal control signal CSS2. For example, the (4_2)-th transistor T4_2 may receive the second sensing signal control signal CSS2 from the multiplexer controller 223 through the second sensing signal control line CSSL2.

The (4_3)-th transistor T4_3 may be connected between the (j+1)-th signal input line Oj+1 and the first output line V1. For example, the (4_3)-th transistor T4_3 may include a first electrode connected to the (j+1)-th signal input line Oj+1, a second electrode connected to the first output line V1, and a gate electrode connected to a third sensing signal control line CSSL3.

The (4_3)-th transistor T4_3 may be turned on in response to a third sensing signal control signal CSS3. For example, the (4_3)-th transistor T4_3 may receive the third sensing signal control signal CSS3 from the multiplexer controller 223 through the third sensing signal control line CSSL3.

The (4_4)-th transistor T4_4 may be connected between the (j+2)-th signal input line Oj+2 and the first output line V1. For example, the (4_4)-th transistor T4_4 may include a first electrode connected to the (j+2)-th signal input line Oj+2, a second electrode connected to the first output line V1, and a gate electrode connected to a fourth sensing signal control line CSSL4.

The (4_4)-th transistor T4_4 may be turned on in response to a fourth sensing signal control signal CSS4. For example, the (4_4)-th transistor T4_4 may receive the fourth sensing signal control signal CSS4 from the multiplexer controller 223 through the fourth sensing signal control line CSSL4.

The vertical driver 224 may include integration circuits, correlated double sampling circuits CDS, or analog-to-digital converters (ADC).

Each of the integration circuits may be disposed between the output lines V1 and V2 and the correlated double sampling circuits CDS. Since the integration circuits are substantially equivalent to each other, the integration circuit connected to the first output line V1 will be described.

In an exemplary embodiment, the integration circuit includes an amplifier AMP, a capacitor CF, and an initialization switch SW_INT. A first input terminal (for example, positive (+) input terminal) of the amplifier AMP is connected to the first output line V1, and a reference voltage VREF is applied to a second input terminal (for example, negative (−) input terminal) of the amplifier AMP.

The capacitor CF may be connected between the first input terminal and the output terminal of the amplifier AMP, and the initialization switch SW_INT may be connected in parallel to the capacitor CF.

When the initialization switch SW_INT is turned off, a charge (that is, sensing signal) provided to the first input terminal is integrated in the capacitor CF, and the amplifier AMP may output the integrated sensing signal SS, that is, a first output signal VOUT1 through the output terminal.

When a switch SW is turned on, the capacitor CF may be initialized.

Each of the correlated double sampling circuits CDS may be disposed between the integration circuits and the analog-to-digital converter ADC.

The correlated double sampling circuit CDS may output a (1_3)-th output signal VOUT1_3 obtained by differentiating a (1_1)-th output signal VOUT1_1 when the reset voltage VRST (or reference voltage) is applied to the sensor pixel SPXL and a (1_2)-th output signal VOUT1_2 when the actual sensing signal SS is applied thereto. As a result, noises included in the first output signal VOUT1 may be reduced.

According to an embodiment, the correlated double sampling circuit CDS includes a first sampling switch SW_R, a second sampling switch SW_S, a first sampling capacitor C_R, a second sampling capacitor C_S, and a differential amplifier AMP_DFF.

In an embodiment, the first sampling switch SW_R is turned on in response to a first sampling signal SHR (see FIG. 8A), and in this embodiment, when the reset voltage VRST is applied to the sensor pixel SPXL, the (1_1)-th output signal VOUT1_1 may be temporarily stored in the first sampling capacitor C_R. In an embodiment, the first sampling signal SHR is applied to a gate electrode of the first sampling switch SW_R. In addition, the second sampling switch SW_S is turned on in response to a second sampling signal SHS (see FIG. 8A), and in this embodiment, when the actual sensing signal SS is applied, the (1_2)-th output signal VOUT1_2 may be temporarily stored in the second sampling capacitor C_S. In an embodiment, the second sampling signal SHS is applied to a gate electrode of the second sampling switch SW_S. The differential amplifier AMP_DFF may differentiate the (1_1)-th output signal VOUT1_1 stored in the first sampling capacitor C_R and the (1_2)-th output signal VOUT1_2 stored in the second sampling capacitor C_S to supply the (1_3)-th output signal VOUT1_3 to the analog-to-digital converter ADC.

However, the correlated double sampling circuit CDS is not limited to the above-described configuration, and various circuits may be applied thereto.

The analog-to-digital converter ADC may convert the analog (1_3)-th output signal VOUT1_3 provided from the correlated double sampling circuit CDS into a digital sensing data signal VOUTD to output it.

However, the embodiment of the vertical driver 224 is not limited thereto. As shown in FIG. 6B, a vertical driver 224' according to an embodiment of the present invention omits the integration circuit and includes a fifth transistor T5. In other words, the vertical driver 224' may be applied with a voltage sensing method instead of a current integral sensing method. According to the embodiment, the fifth transistor T5 includes a first electrode connected to one area of the output lines V1 and V2, a second electrode connected to a ground, and a gate electrode connected to the bias voltage power line PL2 to which the bias voltage VBIAS is applied. In this embodiment, the first electrode may be connected to the output lines V1 and V2 corresponding to a previous stage of the double sampling circuits CDS.

In the sensor pixel SPXL of FIG. 7, the voltage of the photodiode PD generated by photoelectric conversion may be applied to the gate electrode (or first node N1) of the second transistor T2, and a resistance component of the second transistor T2 due to this voltage may be determined. When a current flowing through each of the output lines V1 and V2 is constant, the voltage of the photodiode PD may be proportional to the output voltage (or first output signal VOUT1) according to Ohm's law (V=IR). That is, when a constant bias voltage VBIAS is applied to the gate electrode of the fifth transistor T5, a constant current flows to the ground from each of the output lines V1 and V2, so the fifth transistor T5 may function as a current source.

Through the correlated double sampling circuit CDS, the output voltages before and after the application of the horizontal driving signal HDS, that is, the (1_1)-th output signal VOUT1_1 and the (1_2)-th output signal VOUT1_2 are calculated, and the (1_3)-th output signal VOUT1_3, which is a difference between the two output signals, may be calculated and supplied to the analog-to-digital converter ADC. The correlated double sampling circuit CDS and the analog-to-digital converter ADC have been described with reference to FIG. 6A, and redundant descriptions will be omitted below.

Figure 8A:
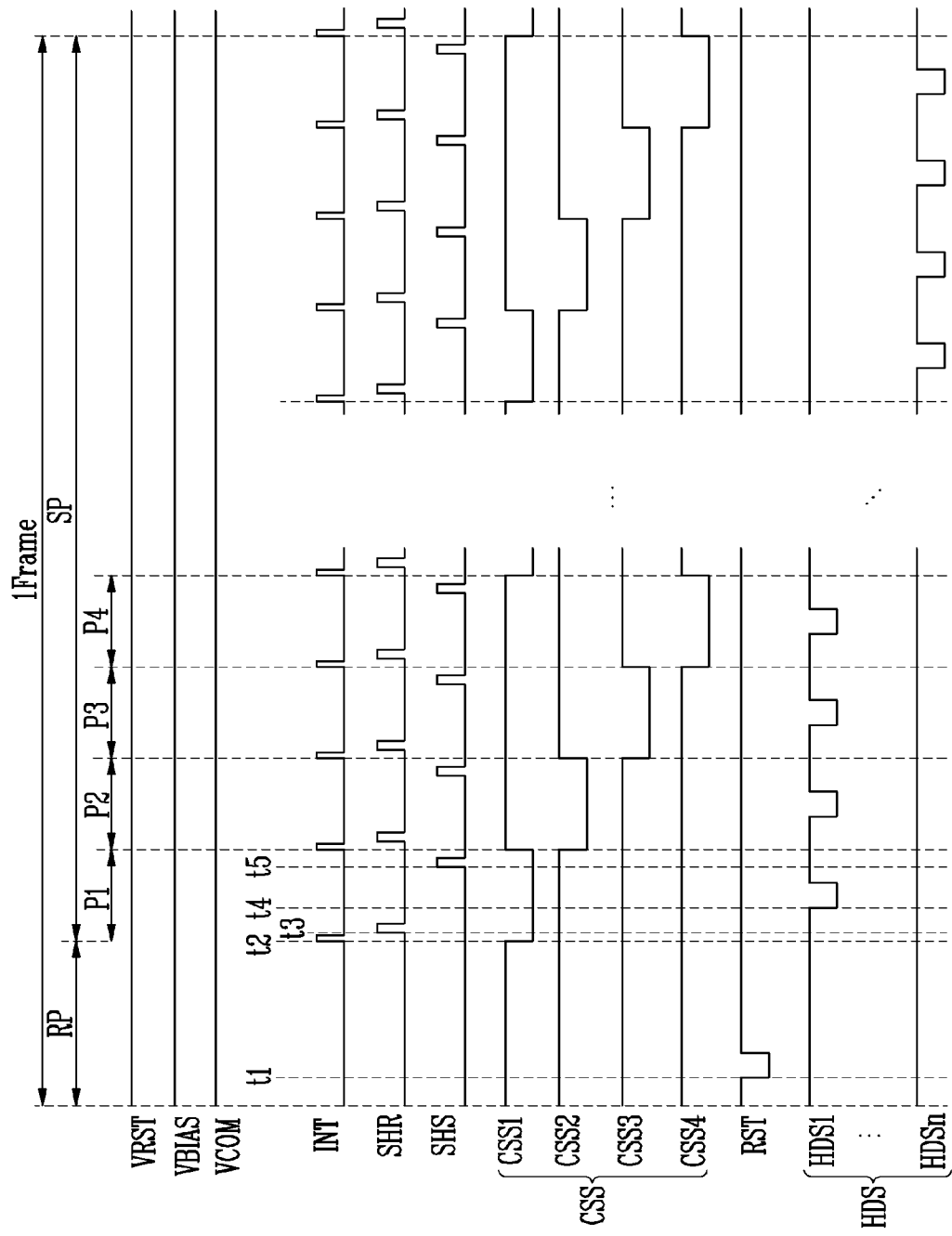

FIG. 8A and FIG. 8B illustrate waveform diagrams for explaining an operation of the sensor array of FIG. 6A according to an exemplary embodiment of the invention.

Referring to FIG. 6A to FIG. 8B, an initialization signal INT is provided to the initialization switch SW_INT (e.g., a gate electrode of SW_INT), the first sampling signal SHR is provided to a first sampling switch SW_R (e.g., a gate electrode of SW_R), and the second sampling signal SHS is provided to a second sampling switch SW_S (e.g., a gate electrode of SW_S). The first sensing signal control signal CSS1 is provided to the first sensing signal control line CSSL1, the second sensing signal control signal CSS2 is provided to the second sensing signal control line CSSL2, the third sensing signal control signal CSS3 is provided to the third sensing signal control line CSSL3, and the fourth sensing signal control signal CSS4 is provided to the fourth sensing signal control line CSSL4. In addition, the reset signal RST is provided to the reset control line RSTL, and the first to n-th horizontal driving signals HDS1 to HDSn is provided to the first to n-th horizontal driving lines H1 to Hn.

In an embodiment, one frame period (Frame) includes a reset period RP and a sensing period SP.

According to an embodiment of the present invention, the reset period RP is included once during one frame period (Frame). In other words, the reset signal RST is not applied per pixel row, but may be applied collectively to all of the sensor pixels SPXL provided in the sensor array PS. Accordingly, when the reset signal RST is applied to the sensor pixel SPXL, an occurrence probability of noise that may be introduced may be reduced.

A stage circuit for applying the reset signal RST such as the stage circuit described in FIG. 4 and FIG. 5 may be used to apply the reset signal RST for each pixel row. That is, since the number of pins of an integrated circuit IC (for example, the input detector 220 (see FIG. 1A and FIG. 1B) connected to the stage circuit increases, a large-area input sensing device ISD (or fingerprint on display (FOD)) is needed. In addition, when a stage circuit for applying the reset signal RST is included, since the reset signal RST is sequentially applied for each pixel row, the occurrence probability of noise that may be introduced when applied to the sensor pixel (SPXL) may increase.

According to an exemplary embodiment, the sensing period SP includes first to fourth periods P1 to P4. During the sensing period SP, the first to fourth periods P1 to P4 may be sequentially repeated. For example, the first to fourth periods P1 to P4 may be repeated with a cycle of 1 horizontal period 1H. For example, a sum of the first to fourth periods P1 to P4 may correspond to one horizontal period.

In the reset period RP, when the reset signal RST is supplied at a first time point t1, the first transistors T1 of all of the pixel rows may be simultaneously turned on. Thus, the reset voltage VRST may be collectively supplied to the first node N1 of the sensor pixel SPXL. That is, when the first transistor T1 is turned on by the reset signal RST, the photodiode PD may be initialized by the reset voltage VRST. In this embodiment, the photodiode PD may perform a photoelectric conversion function after the reset voltage VRST is applied to the first node N1.

However, the number of reset signals RST applied in the reset period RP is not limited thereto, and a reset signal RST may be collectively applied to all rows of the sensor pixel SPXL a plurality of times in one reset period RP. For example, as shown in FIG. 8B, in one reset period RP, the reset signal RST of a logic low level (or gate on voltage) may be applied at least three times. For example, the reset signal RST may include multiple transitions before the transitions of the horizontal scan signal HDS.

Thus, the input sensing device ISD may have improved sensing sensitivity without being affected by a transistor hysteresis characteristic.

During the first period P1, the first sensing signal control signal CSS1 is maintained at a logic low level (or gate-on voltage level). When the first sensing signal control signal CSS1 of the logic low level is provided to the first sensing signal control line CSSL1, the (4_1)-th transistor T4_1 is maintained in a turn-on state, and the (j−1)-th signal input line Oj−1 and the first output Line V1 become electrically connected to one another.

Meanwhile, according to an exemplary embodiment of the present invention, a time point at which the first sensing signal control signal CSS1 is turned on occurs at a second time point t2, and the second time point t2 precedes a third time point t3. In addition, a time point at which the first sensing signal control signal CSS1 is turned off is later than a fifth time point t5. Accordingly, the noise occurring when the first multiplexer MUX1 is turned on and off, which may be introduced into the correlated double sampling circuit CDS, may be reduced. However, the second time point t2 may be later than a time point at which the first sensing signal control signal CSS1 is turned on.

When the initialization signal INT is supplied at the second time point t2, the initialization switch SW_INT of the integration circuit (or vertical driver 224) is turned on. Then, the capacitor CF may be initialized. In this embodiment, the second time point t2 is the same as a starting time point of the first period P1. However, the present invention is not limited thereto, and the second time point t2 may be later than the starting time point of the first period P1.

When the first sampling signal SHR is supplied at the third time point t3, the first sampling switch SW_R is turned on. Then, a signal (or the (1_1)-th output signal VOUT1_1) including noise of the signal input lines Oj−1 to Oj+6 may be temporarily stored in the first sampling capacitor C_R.

Meanwhile, according to an embodiment of the present invention, the vertical driver 224 applies the first sampling signal SHR n times to correspond to n sensing signal control signals CSS. For example, the first sampling signal SHR may be applied four times to correspond to each of the first to fourth sensing signal control signals CSS1 to CSS4. For example, the first sampling signal SHR may transition to a logic high state four times and be applied to a gate terminal of the sampling switch SW.

In other words, since the first sampling switch SW_R is turned on 4 times corresponding to a period in which each of the (4_1)-th transistor T4_1, the (4_2)-th transistor T4_2, the (4_3)-th transistor T4_3, and the (4_4)-th transistor T4_4 included in the first multiplexer MUX1 is turned on, a noise component of each of the signal input lines Oj−1 to Oj+6 may be more accurately calculated.

In contrast, when the first sampling switch SW_R is turned on only in a period in which the (4_1)-th transistor T4_1 is turned on, and when the first sampling switch SW_R is maintained in a turn-off state in periods in which the (4_2)-th transistor T4_2, the (4_3)-th transistor T4_3, and the (4_4)-th transistor T4_4 are turned-on, as a result, since the noise of the (j−1)-th signal input line Oj−1 is equally applied to the j-th, (j+1)-th, and (j+2)-th signal input lines j, j+1 and j+2, the actual noise of each of the signal input lines Oj−1 to Oj+6 may not be accurately reflected. Accordingly, the accuracy of the (1_3)-th output signal VOUT1_3 that is obtained by differentiating the (1_1)-th output signal VOUT1_1 stored in the first sampling capacitor C_R and the (1_2)-th output signal VOUT1_2 stored in the second sampling capacitor C_S through the differential amplifier AMP_DFF and then outputted to the analog-to-digital converter AMP_DFF, may be reduced.

At a fourth time point t4, when a first horizontal driving signal HDS1 is supplied, the third transistor T3 is turned on. Then, the third transistor T3 may transmit the charge (or the measured sensing signal SS) of the second node N2 to the j-th signal input line Oj. In this embodiment, the charge of the second node N2 may be changed based on the light incident on the photodiode PD. Specifically, when the photoelectric conversion function of the photodiode PD is performed, the potential of the first node N1 is changed in proportion to the amount of charge (or current) generated based on the incident light, so that the gate electrode bias of the second transistor T2 is changed. This eventually leads to a change in the potential of the second node N2 (or the second electrode of the second transistor T2).

On the other hand, according to an embodiment of the present invention, the horizontal driver 221 applies the horizontal driving signal HDS n times for each driving line Hi−1, Hi, or Hi+1 to correspond to n sensing control signals CSS. For example, the first horizontal driving signal HDS1 may be applied four times to the j-th driving line Hi to correspond to each of the first to fourth sensing signal control signals CSS1 to CSS4.

In other words, since the third transistor T3 of the sensor pixel SPXL is turned on four times, corresponding to a period in which each of the (4_1)-th transistor T4_1, the (4_2)-th transistor T4_2, the (4_3)-th transistor T4_3, and the (4_4)-th transistor T4_4 included in the first multiplexer MUX1 is turned on, the probability of occurrence of noise in the charge (or the measured sensing signal SS) of the second node N2 may be reduced.

In contrast, when the third transistor T3 of the sensor pixel SPXL is turned on only in a period in which the (4_1)-th transistor T4_1 is turned on, and when the third transistor T3 is maintained in a turn-off state in periods in which the (4_2) transistor T4_2, the (4_3)-th transistor T4_3, and the (4_4)-th transistor T4_4th are turned on, since the charges (sensing signals SS) of the second node N2 measured when the (4_1)-th transistor T4_1 is turned on are outputted as they are when the (4_2)-th transistor T4_2, the (4_3)-th transistor T4_3, and the (4_4)-th transistor T4_4 are turned on, the sensitivities of the charges (or the measured sensing signals SS) of the second node N2 outputted when each of the (4_1)-th transistor T4_1, the (4_2)-th transistor T4_2, the (4_3)-th transistor T4_3, and the (4_4)-th transistor T4_4 is turned on, may be sequentially reduced.

When the second sampling signal SHS is supplied at the fifth time point t5, the second sampling switch SW_S is turned on. Then, when the charge of the second node N2 (or the measured sensing signal SS) is applied, the (1_2)-th output signal VOUT1_2 may be temporarily stored in the second sampling capacitor C_S. In this embodiment, the differential amplifier AMP_DFF may differentiate the (1_1)-th output signal VOUT1_1 stored in the first sampling capacitor C_R and the (1_2)-th output signal VOUT1_2 stored in the second sampling capacitor C_S to supply the (1_3)-th output signal VOUT1_3 to the analog-to-digital converter ADC.

In an exemplary embodiment of the present invention, all of the horizontal driver 221, the multiplexers 222, the horizontal driver 221, and the sensor pixel SPXL are illustrated to have a PMOS structure and described to operate at a logic low, but the present invention is not limited thereto. For example, the drivers may have an NMOS structure or a hybrid structure in which both PMOS and NMOS structure are applied. Accordingly, the turn-on time points of the horizontal driver 221, the multiplexers 222, the horizontal driver 221, and the sensor pixel SPXL may be a logic high.

Similar to the first period P1, in each of the second period P2, the third period P3, and the fourth period P4, each of the second to fourth sensing signal control signals CSS2 to CSS4 is maintained at a logic low level (or gate-on voltage level). In each of the second period P2, the third period P3, and the fourth period P4, when the initialization signal INT is supplied at the second time point t2, the initialization switch SW_INT of the integration circuit (or vertical driver 224) is turned on. When the first sampling signal SHR is supplied at the third time point t3, the first sampling switch SW_R is turned on. When the first horizontal driving signal HDS1 is supplied at the fourth time point t4, the third transistor T3 is turned on. When the second sampling signal SHS is supplied at the fifth time point t5, the second sampling switch SW_S is turned on.

Figure 9:
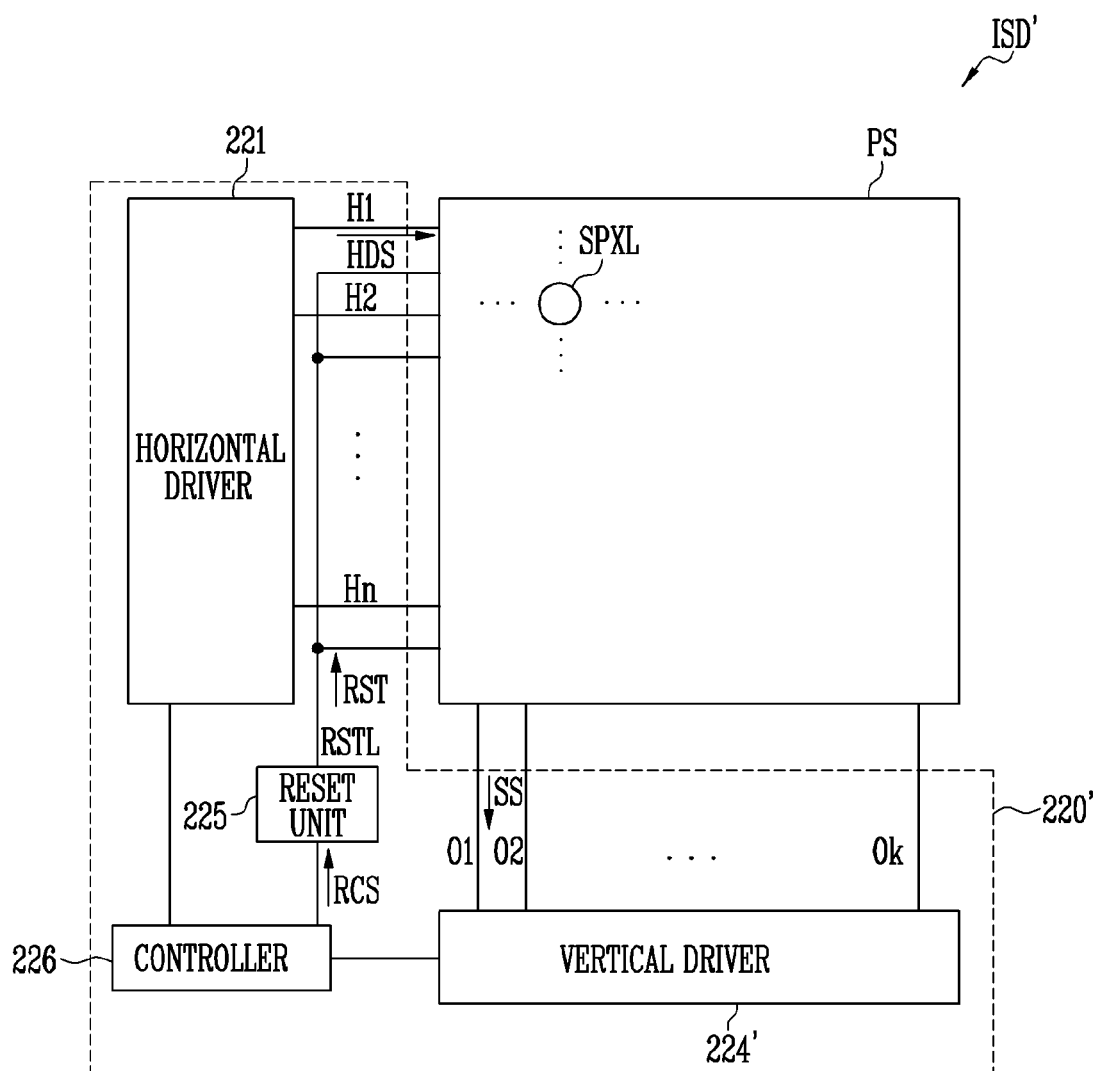
FIG. 9 illustrates a block diagram of an example of an input sensing device included in the display device of FIG. 1A or FIG. 1B.
Figure 10:
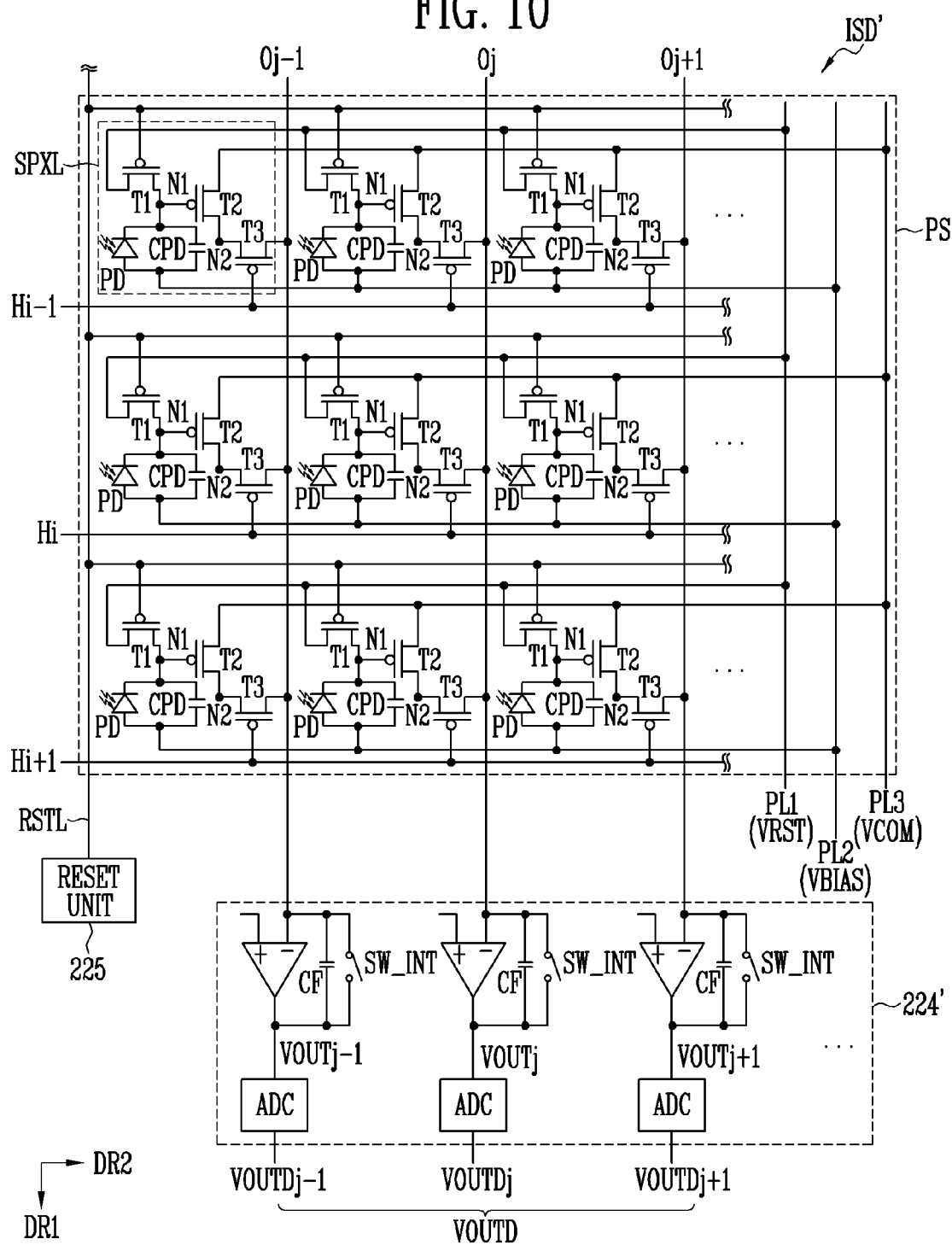
FIG. 10 illustrates a circuit diagram of an example of the input sensing device of FIG. 9.

FIG. 9 illustrates a block diagram of an input sensing device included in the display device of FIG. 1A or FIG. 1B according to an exemplary embodiment of the invention. An input sensing device ISD' includes a sensor array PS and an input detector 220'. FIG. 10 illustrates a circuit diagram of the input sensing device of FIG. 9 according to an exemplary embodiment of the invention.

Referring to FIG. 1A, FIG. 1B, FIG. 3, FIG. 6A, FIG. 9, and FIG. 10, The embodiment shown in FIG. 9 differs from the embodiment shown in FIG. 3 in that the multiplexers 222 and the multiplexer controller 223 are not included, and a vertical driver 224' does not include correlated double sampling circuits CDS. However, for better understanding and ease of description, only some of the elements of FIG. 3 are omitted in the embodiment of FIG. 9, but a method of compensating the sensing data signal VOUTD of the input sensing device IDS' described below may also be applied to the embodiment of FIG. 3.

Referring to FIG. 1A, 1B, and FIG. 9, the sensor array PS may include a plurality of sensor pixels SPXL. In the embodiment, the sensor pixels SPXL is arranged in a two-dimensional array, but the present invention is not limited thereto. The sensor pixel SPXL may include a photoelectric element that photoelectrically converts incident light into a charge according to an amount of the incident light.

In an exemplary embodiment, the input detector 220' includes the horizontal driver 221, the vertical driver 224', the reset unit 225, and the controller 226.

The horizontal driver 221 may be connected to the sensor pixel SPXL through driving lines H1 to Hn (where n is an integer greater than or equal to 2). The horizontal driver 221 may include a shift register or an address decoder, and may sequentially apply a horizontal driving signal to the driving lines H1 to Hn. Here, the horizontal driving signal may be a signal for selectively driving the sensor pixel SPXL. For example, the horizontal driver 221 may apply the horizontal driving signal in a sensor pixel row unit. In an exemplary embodiment, the horizontal driver 221 applies a horizontal driving signal to the first driving line H1 during a first horizontal scan period, applies a horizontal driving signal to the second driving line H2 during a second horizontal scan period, . . . , and applies a horizontal driving signal to an n-th driving line Hn during an n-th horizontal scan period.

The sensor pixel SPXL selected and driven by the horizontal driver 221 senses light by using an internal photoelectric element, and outputs an electrical signal corresponding to the sensed light (that is, the sensing signal SS), for example, a voltage signal. The electrical signal can be an analog signal.

The sensor array PS may provide the sensing signal SS to the vertical driver 224' through the signal input lines O1 to Ok.

The vertical driver 224' may be connected to the signal input lines O1 to Ok, and may be connected to the sensor pixel SPXL through the signal input lines O1 to Ok. The vertical driver 224' may process the signal outputted from the sensor pixel SPXL.

For example, the vertical driver 224' may convert an analog type of electrical signal into a digital type of signal. In the embodiment, an analog-to-digital converter may be provided for each of the signal input lines O1 to Ok, and may process electrical signals (or analog signals) provided from the signal input lines O1 to Ok in parallel.

The reset unit 225 may be connected to one reset control line RSTL, and may be connected to all of the sensor pixels SPXL of the sensor array PS through the reset control line RSTL. The reset unit 225 may simultaneously apply a reset signal RST to all of the sensor pixels SPXL. Here, the reset signal RST may be a signal for applying the reset voltage VRST to the sensor pixel SPXL.

The controller 226 may control the horizontal driver 221, the vertical driver 224', and the reset unit 225.

The controller 226 may provide a clock signal, and a control signal (for example, start pulse) to the horizontal driver 221. In this embodiment, the horizontal driver 221 may generate the horizontal driving signal HDS for selecting and driving the sensor pixel SPXL based on signals provided from the controller 226.

The controller 226 may provide a clock signal and a control signal to the vertical driver 224'. In this embodiment, the vertical driver 224' may periodically sample the sensing signal SS provided from the sensor pixel SPXL based on the clock signal and the control signal, and convert the sampled signal into a digital type of signal.

In an exemplary embodiment, the controller 226 generates image data corresponding to the sensing signal SS received from the vertical driver 224, and processes the generated image data. In addition, the controller 226 may detect an input (for example, a fingerprint or a palm print) from the processed image data, and may authenticate the detected input or transmit it to the outside.

However, this is exemplary, and the image data generation and input detection need not be performed by the controller 226, but may be performed by an external host processor.

The controller 226 may provide a reset unit control signal RCS to the reset unit 225'. The reset unit 225 may receive the reset unit control signal RCS, and generate a reset signal RST based on the received reset unit control signal RCS.

On the other hand, FIG. 9 illustrates an embodiment where the horizontal driver 221, the vertical driver 224', the reset unit 225, and the controller 226 are independently configured, but the present invention is not limited thereto. For example, the vertical driver 224', the reset unit 225, and the controller 226 may be implemented as one integrated circuit, and the horizontal driver 221 may be formed in the sensor array PS through the same process as the sensor pixel SPXL.

FIG. 10 illustrates a circuit diagram of an example of the input sensing device of FIG. 9. FIG. 10 schematically illustrates the input sensing device ISD', based on the sensor pixels SPXL included in an (i−1)-th to (i+1)-th sensor pixel rows (where i is a positive integer smaller than n) and a (j−1)-th to (j+1)-th sensor pixel columns (where j is a positive integer smaller than k), and the reset unit 225 and the vertical driver 224 connected to the sensor pixels SPXL.

Referring to FIG. 7, FIG. 9, and FIG. 10, the input sensing device ISD' (or sensor array PS) may include the horizontal driving lines Hi−1, Hi, and Hi+1, the signal input lines Oj−1, Oj, and Oj+1, the reset control line RSTL, the reset voltage power line PL1, the bias voltage power line PL2, the common voltage power line PL3, and the sensor pixels SPXL connected to each of them.

The horizontal driving lines Hi−1, Hi, and Hi+1 may extend in the second direction DR2, and may be arranged along the first direction DR1 crossing the second direction DR2.

The signal input lines Oj−1, Oj, and Oj+1 may extend in the first direction DR1, and may be arranged along the second direction DR2.

The reset voltage VRST may be applied to the reset voltage power line PL1.

The bias voltage VBIAS may be applied to the bias voltage power line PL2.

The common voltage VCOM may be applied to the common voltage power line PL3.

The sensor pixels SPXL may be electrically connected to the driving lines Hi−1, Hi, and Hi+1, the signal input lines Oj−1, Oj, and Oj+1, the reset voltage power line PL1, the bias voltage power line PL2, and the common voltage power line PL3.

In an exemplary embodiment, the sensor pixel SPXL includes a photodiode PD, a capacitor CPD, a first transistor T1, a second transistor T2, and a third transistor T3. Since the driving of the sensor pixel SPXL is the same as that described above with reference to FIG. 7, a duplicate description thereof will be omitted here.

In an exemplary embodiment, the vertical driver 224' includes integration circuits and analog-to-digital converters (ADC).

Each of the integration circuits may be disposed between the signal input lines Oj−1, Oj, and Oj+1 and the analog-to-digital converter ADC. In an embodiment, the integration circuit includes the amplifier AMP, the capacitor CF, and the initialization switch SW_INT. Since the driving of the integration circuits is the same as that described above with reference to FIG. 6A, a redundant description thereof will be omitted here.

A corresponding one of the integration circuits may supply a (j−1)-th output signal VOUTj−1, a j-th output signal VOUTj, and a (j+1)-th output signal VOUTj+1 to the analog-to-digital converter ADC.

The analog-to-digital converter ADC may convert each of the analog (j−1)-th output signal VOUTj−1, the j-th output signal VOUTj, and the (j+1)-th output signal VOUTj+1 provided from the integration circuits into digital type sensing data signals VOUTD_j−1, VOUTD_j, and VOUTD_j+1 to output them.

Figure 11:
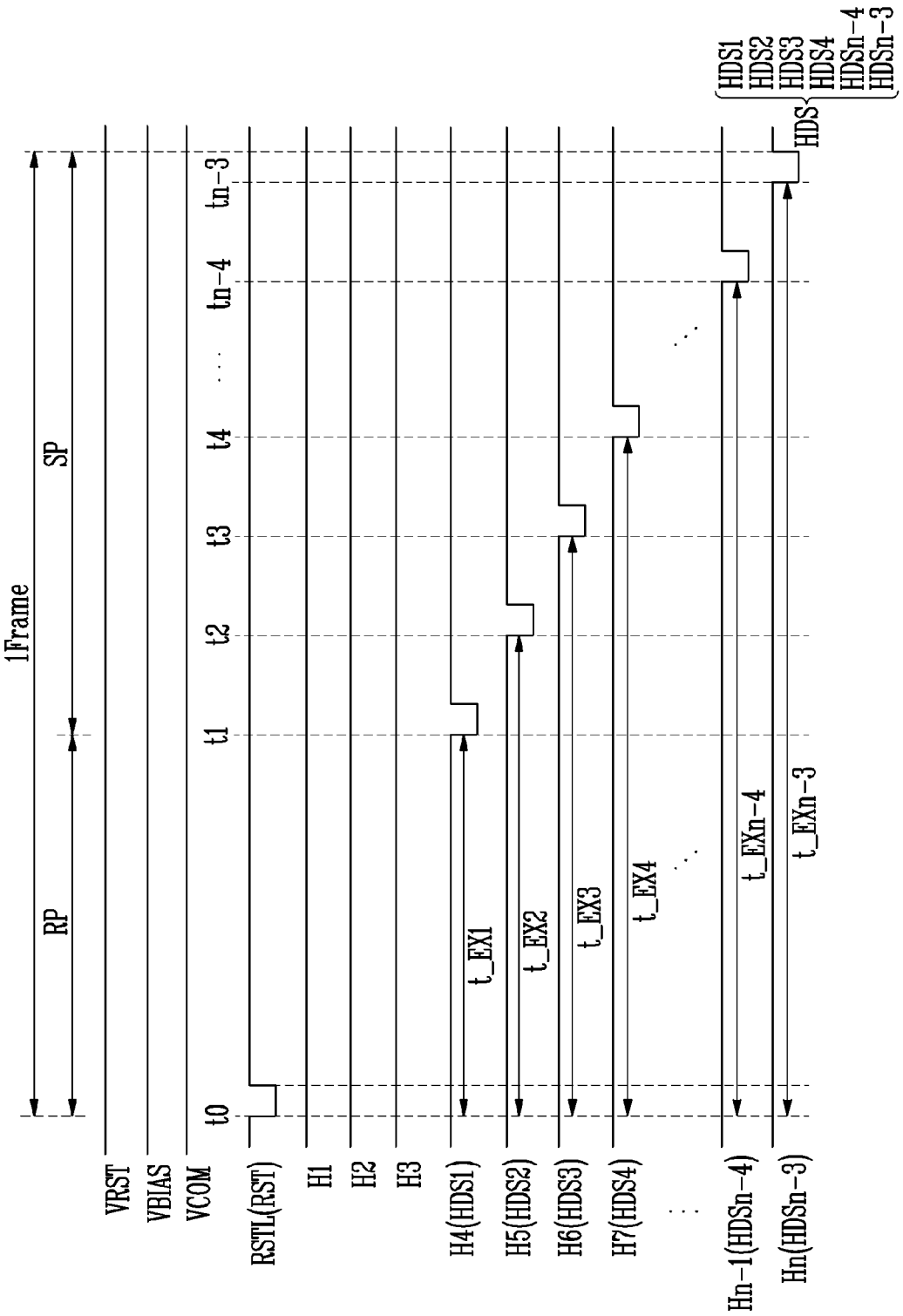
FIG. 11 illustrates a waveform diagram of an operation of the sensor array of FIG. 10 according to an exemplary embodiment of the invention.
Figure 12:
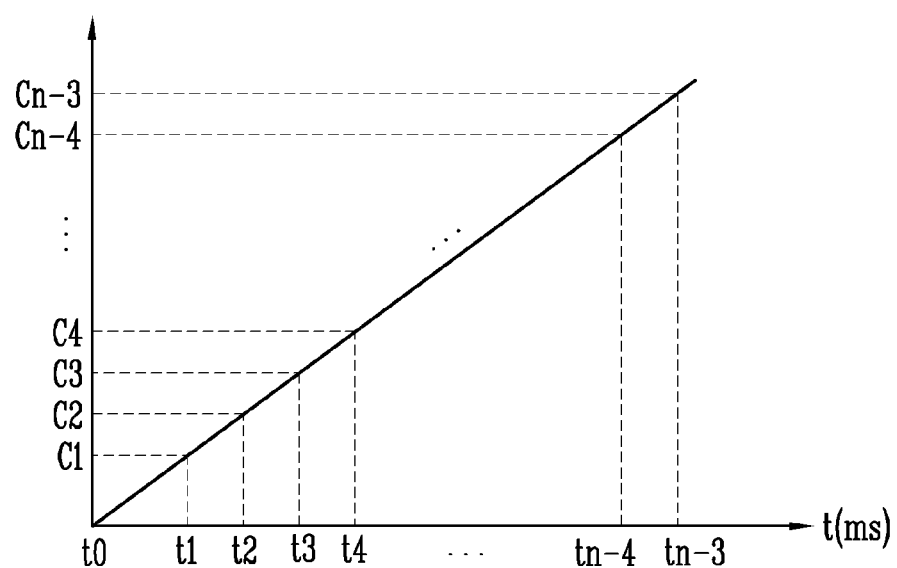
FIG. 12 illustrates a graph of a relationship between a time that a photodiode is exposed to light and an amount of charge accumulated in a capacitor.

FIG. 11 illustrates a waveform diagram of an operation of the sensor array of FIG. 10 according to an exemplary embodiment of the disclosure. FIG. 12 illustrates a graph of a relationship between a time that a photodiode is exposed to light and an amount of charges accumulated in a capacitor.

Referring to FIG. 9 to FIG. 11, the reset signal RST is provided to the reset control line RSTL, and the first to (n–3)-th horizontal driving signals HDS1 to HDSn-3 may be provided to the fourth to n-th horizontal driving lines H1 to Hn. In this embodiment, the first to third driving lines H1 to H3 are dummy driving lines, and the horizontal driving signal HDS is not be applied to the dummy driving lines.

In an embodiment, one frame period (Frame) includes the reset period RP and the sensing period SP.

According to an exemplary embodiment of the present invention, the reset period RP is included once during one frame period (Frame). In other words, the reset signal RST is not applied per pixel row, but may be applied collectively to all of the sensor pixels SPXL provided in the sensor array PS. Accordingly, when the reset signal RST is applied to the sensor pixel SPXL, an occurrence probability of noise that may be introduced may be reduced.

In contrast, a stage circuit for applying the reset signal RST such as the stage circuit described in FIG. 4 and FIG. 5 may be used to apply the reset signal RST for each pixel row. In this embodiment, since a large number of pins of an IC (for example, the input detector 220 (see FIG. 1A and FIG. 1B) are connected when there are large number of stage circuits, an input sensing device ISD (or fingerprint on display (FOD)) having a large area is used. In addition, when a stage circuit for applying the reset signal RST is included, since the reset signal RST is sequentially applied for each pixel row, the occurrence probability of noise that may be introduced when applied to the sensor pixel (SPXL) may increase.

According to an exemplary embodiment of the disclosure, the first to (n–3)-th horizontal driving signals HDS1 to HDSn-3 are sequentially applied to the sensor pixel SPXL through the fourth to n-th driving lines H4 to Hn during the sensing period SP.

In the reset period RP, when the reset signal RST is supplied at a zero time point t0, the first transistors T1 of all of the pixel rows may be simultaneously turned on. Then, the reset voltage VRST may be collectively supplied to the first node N1 of the sensor pixel SPXL. That is, when the first transistor T1 is turned on by the reset signal RST, the photodiode PD is initialized by the reset voltage VRST. In this embodiment, the photodiode PD may perform a photoelectric conversion function after the reset voltage VRST is applied to the first node N1.

Thereafter, when the first horizontal driving signal HDS1 is supplied at the first time point t, the third transistor T3 of the fourth pixel row is turned on. Then, the third transistor T3 may transmit the charge (or the measured sensing signal SS) of the second node N2 to the signal input lines Oj–1, Oj, and Oj+1.

Similar to the first time point t1, at the second time point t2 to (n–3)-th time point tn-3, when the second to (n–3)-th horizontal driving signals HDS2 to HDSn-3 are sequentially supplied, the third transistor T3 of a corresponding pixel row may be sequentially turned on in pixel row units.

In this embodiment, the charge of the second node N2 of the sensor pixel SPXL may be changed based on the light incident on the photodiode PD. Specifically, when the photoelectric conversion function of the photodiode PD is performed, the potential of the first node N1 is changed in proportion to the amount of charge (or current) generated based on the incident light, so that the gate electrode bias of the second transistor T2 is changed. This eventually leads to a change in the potential of the second node N2 (or the second electrode of the second transistor T2).

A graph shown in FIG. 12 shows that after the reset signal RST is applied to the first transistor T1, as an elapsed time increases, an amount of charge stored in the capacitor SW_PD increases at a constant ratio. That is, when the horizontal driving signal HDS is applied late, since an exposure time of the photodiode PD increases, the amount of charge stored in the capacitor CPD may increase. For example, the amount of charge stored in the capacitor CPD of the sensor pixel SPXL disposed in the n-th pixel row may be larger than the amount of charge stored in the capacitor CPD of the sensor pixel SPXL disposed in the fourth pixel row.

When the reset signal RST is applied for each pixel row, since the period from the time point when the reset signal RST is applied to the time point when the horizontal driving signal HDS of each pixel row is applied is the same, and thus since the exposure time of the photodiode PD is the same for each pixel row, the sensing data signals VOUTDj–1, VOUTDj, and VOUTDj+1 corresponding to the sensing signal SS (see FIG. 1A and FIG. 1B) to be actually measured may be obtained. However, when the exposure time of the photodiode PD is different for each pixel row as in an embodiment of the present invention, as a result, the sensing data signals VOUTDj–1, VOUTDj, and VOUTDj+1 corresponding to the sensing signal SS to be actually measured are not obtained.

In this embodiment, an exposure time t_EX1 of the photodiode PD in the fourth pixel row is a period between the 0-th time point t0 and the first time point t1; an exposure time t_EX2 of the photodiode PD in the fifth pixel row is a period between the 0-th time point t0 and the second time point t2; an exposure time t_EX3 of the photodiode PD in the sixth pixel row is a period between the 0-th time point t0 and the third time point t3; an exposure time t_EX4 of the photodiode PD in the seventh pixel row is a period between the 0-th time point t0 and the fourth time point t4; an exposure time t_Exn-4 of the photodiode PD in the (n–1)-th pixel row is a period between the 0-th time point t0 and the (n–4)-th time point tn-4; and an exposure time t_Exn-3 of the photodiode PD in the n-th pixel row is a period between the 0-th time point t0 and the (n–3)-th time point tn-3 (wherein t_EX1<t_EX2<t_EX3<t_EX4<t_EXn-4<t_Exn-3).

Therefore, a correction is applied to the input sensing device ISD' according to an exemplary embodiment of the present invention for obtaining the sensing data signals VOUTDj–1, VOUTDj, and VOUTDj+1 that may be obtained when the exposure time of the photodiode PD is the same for each pixel row. According to an exemplary embodiment, the sensed data signals VOUTDj–1, VOUTDj, and VOUTDj+1 are scale-corrected to be inversely proportional to the order in which they are generated.

For example, the amount of charge stored in the capacitor CPD of the sensor pixel SPXL disposed in the fourth pixel row is divided by the time t_EX1 the photodiode PD of the sensor pixel SPXL disposed in the fourth pixel row is exposed to light, and the amount of charge stored in the capacitor CPD of the sensor pixel SPXL disposed in the n-th pixel row is divided by the time t_Exn-3 the photodiode PD of the sensor pixel SPXL disposed in the n-th pixel row is exposed to light, and thus a scale correction may be performed. For example, a first sensing data signal sensed earlier within a frame period than a second sensing data signal may be divided by a first value proportional to an exposure time of a first photodiode of a first sensor pixel to generate a corrected first sensing data signal and the second sensing data signal may be divided by a second value larger than the first value that is proportional to an exposure time of a second photodiode of a second sensor pixel to generate a corrected second sensing data signal.

In this embodiment, as described in FIG. 12, since the relationship between the exposure time of the photodiode PD and the capacitor CPD may be experimentally measured, a lookup table may be generated in advance based on the measured data to correct the sensing data signal VOUTD.

However, the correction method is not limited thereto, and after outputting the sensing data signals VOUTDj−1, VOUTDj, and VOUTDj+1 without correction, the outputted sensing data signals VOUTDj−1, VOUTDj, and VOUTDj+1 may be directly divided by the time the photodiode PD is exposed to light for each row, and thus, the scale correction may also be performed.

According to an exemplary embodiment of the present invention, when the reset signal RST is simultaneously applied to all of the sensor pixels SPXL and the sensing data signal VOUTD is corrected later, since there is no need to provide a stage circuit to apply the reset signal RST for each pixel row, a large-area input sensing device ISD (or fingerprint on display (FOD)) can be implemented. In addition, since the number of times the reset signal RST is applied is reduced, the probability of occurrence of noise that may be introduced when a signal is applied to the sensor pixel SPXL may be reduced.

Figure 13:
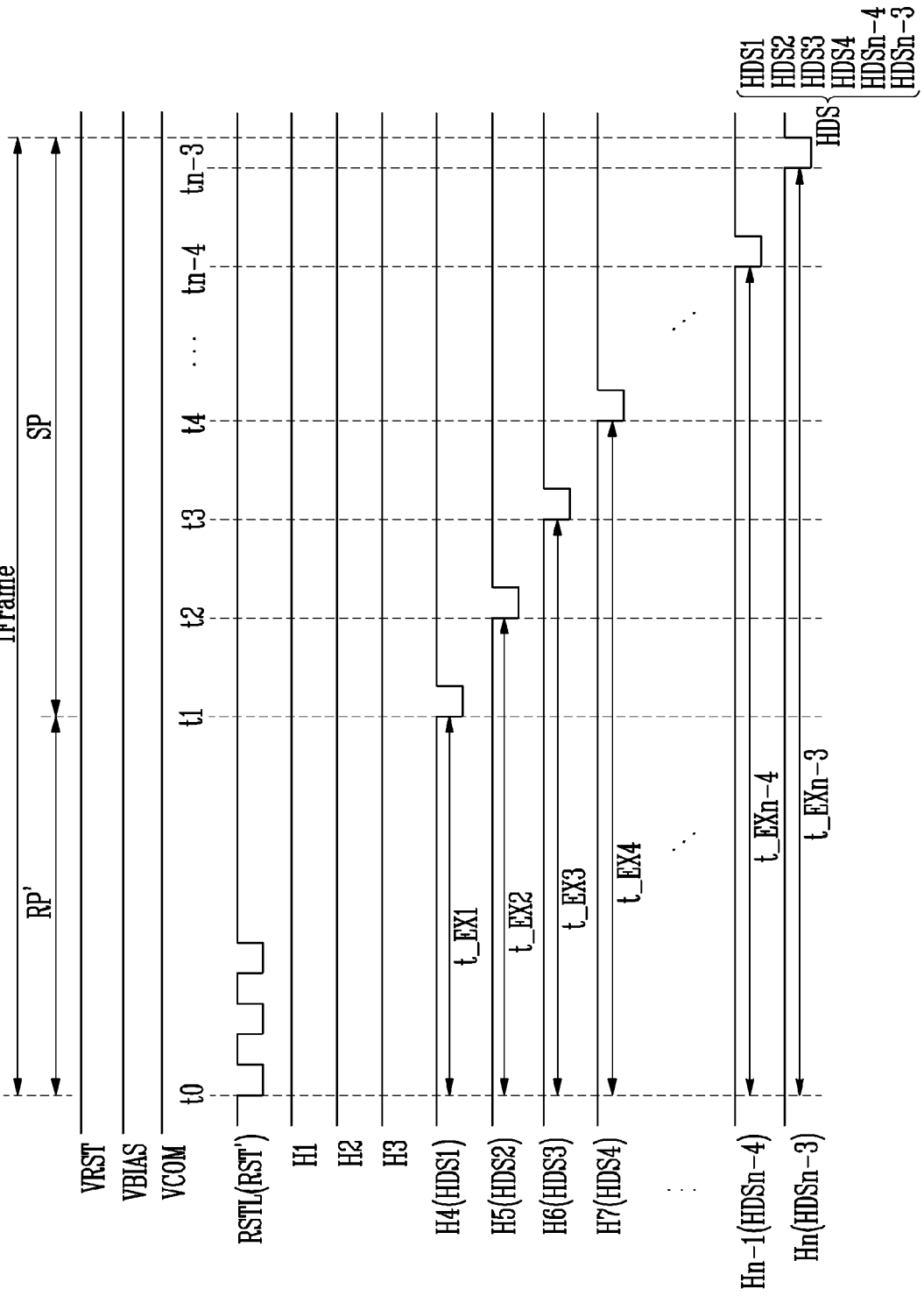
FIG. 13 illustrates a waveform diagram of an operation of the sensor array of FIG. 10 according to an exemplary embodiment of the invention.

FIG. 13 illustrates a waveform diagram of an operation of the sensor array of FIG. 10 according to an exemplary embodiment of the invention.

Referring to FIG. 13, there is a difference from the embodiment shown in FIG. 11 in that the reset signal RST' is provided to the reset control line RSTL a plurality of times during a reset period RP'. For example, the reset signal RST' may transition a plurality of times during the reset period RP'.

According to an exemplary embodiment of the present invention, one frame period (Frame) includes the reset period RP' and the sensing period SP.

According to the embodiment of the present invention, the reset period RP' is included once during one frame period (Frame), and the reset signal RST' is collectively applied to all of the rows of the sensor pixel SPXL a plurality of times in one reset period RP'. For example, as shown in FIG. 13, in one reset period RP', the reset signal RST' of a logic low level (or gate on voltage) may be applied at least three times.

Thus, the input sensing device ISD may have improved sensing sensitivity without being affected by transistor hysteresis characteristic.

FIG. 14 illustrates a flowchart of a sensing method of an input sensing device according to an exemplary embodiment of the invention.

Referring to FIG. 3 to FIG. 14, the sensing method of the input sensing devices ISD and ISD' (see FIG. 3 and FIG. 9) includes simultaneously applying the reset signal RST to all of the sensor pixels SPXL through the reset unit 225 (S10).

The reset unit 225 may collectively apply the reset signal RST to all of the sensor pixels SPXL through the reset control line RSTL once. Accordingly, when the reset signal RST is applied to the sensor pixel SPXL, the probability of occurrence of noise that may be introduced may be reduced.

Thereafter, the sensing method of the input sensing devices ISD and ISD' includes generating a sensing signal in response to the reset signal RST by the sensor pixels SPXL (S20).

The photodiode PD may perform a photoelectric conversion function after the reset voltage VRST is applied. The capacitor CPD may temporarily store a charge (or current) generated by the photodiode PD. When the photoelectric conversion function of the photodiode PD is performed, the potential of the first node N1 connected to the cathode of the photodiode PD may be changed in proportion to an amount of charge (or current) generated based on incident light.

Then, the sensing method of the input sensing devices ISD and ISD' includes sequentially applying the horizontal driving signal HDS to the sensor pixels SPXL by the horizontal driver 221 (S30).

According to an embodiment of the present invention, when the input sensing device ISD includes the multiplexers 222, since the third transistor T3 of the sensor pixel SPXL is turned on four times, corresponding to a period in which each of the (4_1)-th transistor T4_1, the (4_2)-th transistor T4_2, the (4_3)-th transistor T4_3, and the (4_4)-th transistor T4_4 included in the multiplexers 222 is turned on, the probability of occurrence of noise in the measured sensing signal SS may be reduced.

Thereafter, the sensing method of the input sensing devices ISD and ISD' includes receiving the sensing signal SS sequentially outputted in response to the horizontal driving signal HDS (S40).

When the horizontal driving signal HDS is supplied, the third transistor T3 may be turned on for each pixel row. Then, the third transistor T3 may transmit the measured sensing signal SS to the signal input lines O1 to Ok. The vertical driver 224 may receive the sensing signal SS through the output lines V1 to Vm.

Thereafter, the sensing method of the input sensing devices ISD and ISD' includes generating the sensing data signal VOUTD corresponding to the received sensing signal SS (S50).

The amplifier AMP of the integration circuits may output the integrated sensing signal SS, that is, the first output signal VOUT1 through a corresponding output terminal.

When the vertical driver 224 includes the correlated double sampling circuit CDS, the correlated double sampling circuit CDS may output the (1_3)-th output signal VOUT1_3 obtained by differentiating the (1_1)-th output signal VOUT1_1 when the reset voltage VRST (or reference voltage) is applied to the sensor pixel SPXL and the (1_2)-th output signal VOUT1_2 when the actual sensing signal SS is applied thereto. Thus, the noise of the first output signal VOUT1 may be reduced.

The analog-to-digital converter ADC may convert the analog (1_3)-th output signal VOUT1_3 provided from the correlated double sampling circuit CDS into a digital sensing data signal VOUTD to output it.

Thereafter, the sensing method of the input sensing devices ISD and ISD' includes correcting a scale so as to be inversely proportional to the order in which the sensing data signals are generated (S60).

In the input sensing device ISD' according to an exemplary embodiment of the present invention, a correction is performed for obtaining the sensing data signals VOUTDj−1, VOUTDj, and VOUTDj+1 that may be obtained when the exposure time of the photodiode PD is the same for each pixel row. According to an exemplary embodiment, the sensed data signals VOUTDj−1, VOUTDj, and VOUTDj+1 are scale-corrected to be inversely proportional to the order in which they are generated.

According to an exemplary embodiment of the present invention, when the reset signal RST is simultaneously applied to all of the sensor pixels SPXL and the sensing data signal VOUTD is corrected later, since there is no need to provide a stage circuit to apply the reset signal RST for each pixel row, a large-area input sensing device ISD (or fingerprint on display (FOD)) may be implemented. In addition, since the number of times the reset signal RST is applied is reduced, the probability of occurrence of noise that may be introduced when a signal is applied to the sensor pixel SPXL may be reduced.

While this invention has been described in connection with exemplary embodiments, it is to be understood that the invention is not limited to the disclosed embodiments, but, on the contrary, is intended to cover various modifications and equivalent arrangements included within the spirit and scope of the disclosure.

What is claimed is:

1. An input sensing device comprising:
   a plurality of sensor pixels, where each sensor pixel is connected to a corresponding one of a plurality of driving lines and a corresponding one of a plurality of signal input lines;
   a horizontal driver configured to sequentially apply a horizontal driving signal to the plurality of sensor pixels through the driving lines;
   a selection circuit connected to n of the signal input lines and to one output line, the selection circuit configured to sequentially output n sensing signals received through the n signal input lines to the one output line, where n is a natural number of 2 or more and the selection circuit includes n selection transistors connected between the n signal input lines and the one output line; and
   a vertical driver configured to receive the n sensing signals through the one output line,
   wherein the horizontal driver applies the horizontal driving signal to a given one of the driving lines n times to correspond to the n sensing signals,
   wherein each of n sensor pixels among the sensor pixels include a pixel transistor connected to a corresponding one of the n signal input lines, and
   during each of n sequential periods of part of a sensing period, the n times of the horizontal driving signal of a gate-on voltage level is applied to the given one driving line to turn on the pixel transistor of one of the n sensor pixels while a sensing signal control signal is applied to turn on a corresponding one of the n selection transistors,
   wherein the vertical driver comprises:
   an integration circuit for integrating a corresponding one of the sensing signals to generate a first output signal;
   an analog-to-digital converter that converts the first output signal of an analog type into a sensing data signal of a digital type; and
   a correlated double sampling circuit disposed between an output terminal of the integration circuit and the analog-to-digital converter,
   wherein the correlated double sampling circuit comprises:
   a first sampling switch disposed between the output terminal and the analog-to-digital converter;
   a second sampling switch disposed between the output terminal and the analog-to-digital converter;
   a first sampling capacitor including one terminal connected between the first sampling switch and the analog-to-digital converter;
   a second sampling capacitor including one terminal connected between the second sampling switch and the analog-to-digital converter; and
   a differential amplifier including a first input terminal connected to one terminal of the first sampling capacitor, a second input terminal connected to one terminal of the second sampling capacitor, and an output terminal, and
   wherein each of the n selection transistors is turned on before the first sampling switch is turned on, and is turned off after the second sampling switch is turned off.

2. The input sensing device of claim 1, wherein the integration circuit comprises:
   an amplifier including a first input terminal connected to the output line, a second input terminal connected to a reference voltage line, and an output terminal;
   a capacitor including a first electrode connected to the first input terminal and a second electrode connected to the output terminal; and
   an initialization switch disposed between the first input terminal and the output terminal.

3. The input sensing device of claim 2, wherein the correlated double sampling circuit turns on the first sampling switch before the horizontal driving signal is applied to store a (1_1)-th output signal in the first sampling capacitor, and turns on the second sampling switch after the horizontal driving signal is applied to store a (1_2)-th output signal in the second sampling capacitor, and the differential amplifier outputs a (1_3)-th output signal by differentiating the (1_1)-th output signal and the (1_2)-th output signal.

4. The input sensing device of claim 2, wherein the amplifier turns on the initialization switch before turning on the first sampling switch.

5. The input sensing device of claim 2, wherein each of the n selection transistors is turned on before the initialization switch is turned on.

6. The input sensing device of claim 1, wherein the horizontal driving signal is applied n times to each driving line.

7. The input sensing device of claim 1, wherein at least one of the plurality of sensor pixels is further connected to a reset voltage power line, a bias voltage power line, and a common voltage power line.

8. The input sensing device of claim 7, further comprising:
   a reset circuit that is connected to the plurality of sensor pixels and a reset signal control line and simultaneously applies a reset voltage to the plurality of sensor pixels.

9. The input sensing device of claim 8, wherein at least one of the plurality of sensor pixels comprises:
   a first transistor including a first electrode connected to the reset voltage power source, a second electrode connected to a first node, and a gate electrode connected to the reset signal control line;
   a photodiode including an anode electrode connected to the bias voltage power line and a cathode electrode connected to the first node;
   a second transistor including a first electrode connected to the common voltage power line, a second electrode connected to a second node, and a gate electrode connected to the first node; and
   the pixel transistor including a first electrode connected to the second node, a second electrode connected to the signal input line, and a gate electrode connected to the driving line.

10. The input sensing device of claim 9, wherein the sensor pixel further includes a capacitor including a first electrode connected to the bias voltage power line and a second electrode connected to the first node.

\* \* \* \* \*